(12) United States Patent
Park et al.

(10) Patent No.: US 12,342,336 B2
(45) Date of Patent: Jun. 24, 2025

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd., Suwon-si (KR)

(72) Inventors: Sungjin Park, Suwon-si (KR); Youngbum Kim, Suwon-si (KR); Hyunseok Ryu, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 17/700,967

(22) Filed: Mar. 22, 2022

(65) Prior Publication Data

US 2022/0304020 A1    Sep. 22, 2022

(30) Foreign Application Priority Data

Mar. 22, 2021   (KR) .................. 10-2021-0036759

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01);
(Continued)

(58) Field of Classification Search
CPC .......... H04W 72/1268; H04W 72/569; H04W 72/23; H04W 72/0446; H04L 1/1812; H04L 5/0053
See application file for complete search history.

(56) References Cited

U.S. PATENT DOCUMENTS 11,647,462 B2 *   5/2023   Lin .................. H04W 52/0225
                                                            370/311
2014/0307597 A1 * 10/2014  Kim ..................... H04L 5/1469
                                                            370/280
(Continued)

FOREIGN PATENT DOCUMENTS

EP            3641201 A1    4/2020
KR    10-2016-0110617 A     9/2016

OTHER PUBLICATIONS

LG Electronics, 'Remaining aspects for supporting PUCCH on Scell,' 3GPP TSG RAN WG1 Meeting #80bis, R1-151498, Belgrade, Serbia, Apr. 20-24, 2015.
(Continued)

*Primary Examiner* — Michael J Moore, Jr.
(74) *Attorney, Agent, or Firm* — Jefferson IP Law, LLP

(57) ABSTRACT

A method performed by a user equipment (UE) in a wireless communication system is provided. The method includes receiving configuration information regarding a plurality of cells for physical uplink control channel (PUCCH) transmission, identifying a secondary cell (SCell) among the plurality of cells based on the configuration information, and in case that a plurality of slots on the SCell overlap with a slot on a primary cell (PCell), transmitting a PUCCH on a first slot among the plurality of slots on the SCell.

16 Claims, 19 Drawing Sheets

(51) Int. Cl.
  *H04L 5/00* (2006.01)
  *H04W 72/0446* (2023.01)
  *H04W 72/23* (2023.01)
  *H04W 72/566* (2023.01)
(52) U.S. Cl.
  CPC ....... *H04W 72/0446* (2013.01); *H04W 72/23* (2023.01); *H04W 72/569* (2023.01)

(56) References Cited

U.S. PATENT DOCUMENTS

| | | | |
|---|---|---|---|
| 2015/0245347 A1 | 8/2015 | Yi et al. | |
| 2019/0045495 A1* | 2/2019 | Chen | H04L 5/0044 |
| 2020/0022175 A1 | 1/2020 | Xiong et al. | |
| 2021/0266946 A1* | 8/2021 | Li | H04L 1/1812 |
| 2021/0410165 A1* | 12/2021 | Xiong | H04L 5/001 |
| 2022/0053522 A1* | 2/2022 | MolavianJazi | H04L 27/26025 |
| 2022/0104224 A1* | 3/2022 | Choi | H04L 5/0055 |
| 2022/0109597 A1* | 4/2022 | Takeda | H04L 1/0038 |
| 2022/0116968 A1* | 4/2022 | Choi | H04W 72/1268 |
| 2022/0240244 A1* | 7/2022 | Hugl | H04L 5/001 |
| 2022/0304020 A1* | 9/2022 | Park | H04L 5/001 |
| 2022/0394682 A1* | 12/2022 | Nory | H04W 72/0453 |
| 2023/0276224 A1* | 8/2023 | Wei | H04W 72/1273 370/329 |
| 2023/0354327 A1* | 11/2023 | El Hamss | H04L 5/001 |
| 2023/0379095 A1* | 11/2023 | Kittichokechai | H04L 1/1854 |

OTHER PUBLICATIONS

Vivo, 'UCI enhancements for URLLC,' 3GPP TSG RAN WG1 Meeting #99, R1-1912031, Reno, USA, Nov. 18-22, 2019.
Intel Corp., 'Discussion on HARQ feedback of TDD Inter-band Carrier Aggregation,' 3GPP TSG-RAN WG1 Meeting #68, R1-120207, Feb. 6-10, 2012, Dresden, Germany.
International Search Report and written opinion dated Jun. 24, 2022, issued in International Application No. PCT/KR2022/003929.
Extended European Search Report dated Jun. 5, 2024, issued in European Patent Application No. 22776022.0.

* cited by examiner

METHOD AND APPARATUS FOR TRANSMITTING AND RECEIVING CONTROL INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0036759, filed on Mar. 22, 2021, in the Korean Intellectual Property Office, the disclosure of which is incorporated by reference herein in its entirety.

BACKGROUND

1. Field

The disclosure relates to a method and apparatus for transmitting and receiving control and data information in a wireless communication system.

2. Description of Related Art

To meet demand due to ever-increasing wireless data traffic after commercialization of the $4^{th}$ generation (4G) communication system, there have been efforts to develop an advanced $5^{th}$ generation (5G) system or pre-5G communication system. For this reason, the 5G or pre-5G communication system is also called a beyond 4G network communication system or post long term evolution (LTE) system. The 5G communication system defined by third generation partnership project (3GPP) is called a new radio (NR) system. Implementation of the 5G communication system using ultra-frequency millimeter wave (mmWave) bands, e.g., 60 GHz bands, is considered to achieve higher data rates. To reduce pathloss of radio waves and to increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion and applied to the NR system. Also, to improve a network of the system, techniques, such as an advanced small cell, a cloud radio access network (cloud RAN), a ultra-dense network, device-to-device (D2D) communication, wireless backhaul, a moving network, cooperative communication, coordinated multi-points (CoMP), and reception interference cancellation, have been developed in the 5G communication system. In addition, advanced coding modulation (ACM) schemes, namely, hybrid frequency-shift keying (FSK) and quadrature amplitude modulation (QAM) (FQAM) and sliding window superposition coding (SWSC), and advanced access techniques, namely, a filter bank multi-carrier (FBMC), a non-orthogonal multiple access (NOMA), and a sparse coding multiple access (SCMA), have been developed, in the 5G communication system.

In the meantime, the Internet is evolving from a human-centered connectivity network where humans generate and consume information to an Internet of Things (IoT) network where distributed entities or things send, receive and process information. Internet of everything (IoE) technologies in which big data processing technologies, etc. based on connection with a cloud server, etc. are combined with the IoT technologies have also emerged. To implement the IoT, technological elements, such as a sensing technology, a wired/wireless communication and network infrastructure, a service interface technology, and a security technology, are required, and thus, recently, techniques for connection between things, such as a sensor network, machine-to-machine (M2M) communication, machine-type communication (MTC), etc., have been studied. In an IoT environment, intelligent Internet technology (IT) services that create new values in human life by collecting and analyzing data generated among connected things, may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Thus, various attempts have been made to apply the 5G communication system to an IoT network. For example, techniques, such as a sensor network, M2M communication, MTC, etc., are implemented based on 5G communication techniques, such as beamforming, MIMO, an array antenna, etc. As described above, that the cloud RAN may be applied as the big data processing technology may also be regarded as an example of the convergence between the 5G technology and the IoT technology. With the advances in technology described above and a wireless communication system, it has become possible to provide various services. Thus, a method of effectively providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transmitting and receiving control and data information in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving configuration information regarding a plurality of cells for physical uplink control channel (PUCCH) transmission, identifying a secondary cell (SCell) among the plurality of cells based on the configuration information, and in case that a plurality of slots on the SCell overlap with a slot on a primary cell (PCell), transmitting a PUCCH on a first slot among the plurality of slots on the S Cell.

In accordance with another aspect of the disclosure, a method performed by a base station (BS) in a wireless communication system is provided. The method includes transmitting configuration information regarding a plurality of cells including a primary cell (PCell) and a secondary cell (SCell) for physical uplink control channel (PUCCH) transmission, and in case that a plurality of slots on the SCell overlap with a slot on the PCell, receiving a PUCCH on a first slot among the plurality of slots on the SCell.

In accordance with another aspect of the disclosure, a user equipment (UE) in a wireless communication system is provided. The user equipment includes a transceiver, and a processor coupled with the transceiver and configured to receive configuration information regarding a plurality of cells for physical uplink control channel (PUCCH) transmission, identify a secondary cell (SCell) among the plurality of cells based on the configuration information, and in case that a plurality of slots on the SCell overlap with a slot on a primary cell (PCell), transmit a PUCCH on a first slot among the plurality of slots on the SCell.

In accordance with another aspect of the disclosure, a base station (BS) in a wireless communication system is provided. The base station includes a transceiver, and a processor coupled with the transceiver and configured to transmit configuration information regarding a plurality of cells including a primary cell (PCell) and a secondary cell (SCell) for physical uplink control channel (PUCCH) transmission, and in case that a plurality of slots on the SCell overlap with a slot on the PCell, receive a PUCCH on a first slot among the plurality of slots on the SCell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
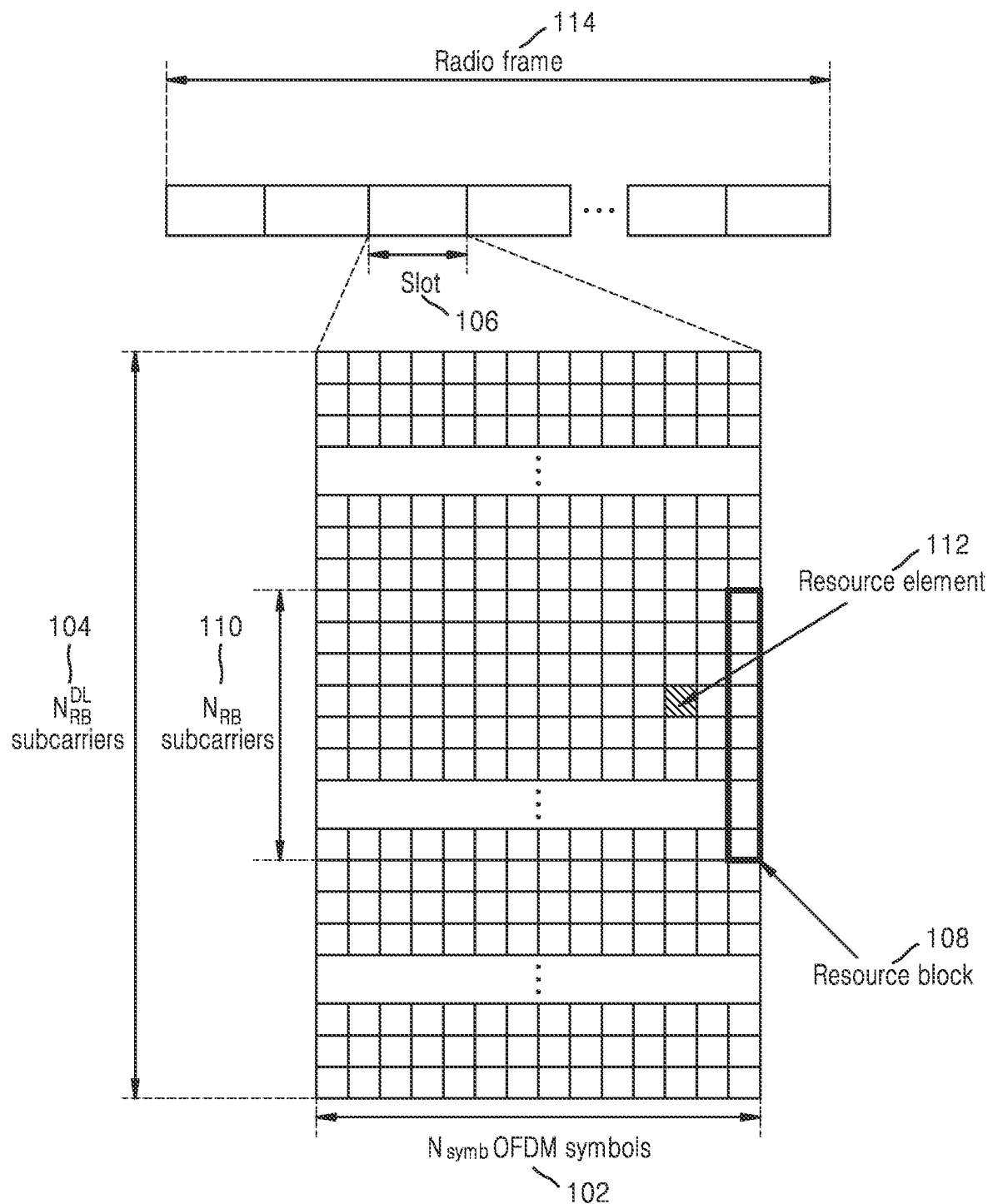
FIG. 1 is a diagram of a transmission structure of a time-frequency domain that is a radio resource region of a 5$^{th}$ generation (5G) system or a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments of the disclosure are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instructions for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It should also be noted that the functions described in the blocks may occur out of order in alternate embodiments of the disclosure. For example, two blocks shown in succession may in fact be executed substantially concurrently or the blocks may sometimes be executed in the reverse order, depending upon the functionality involved.

Here, the term "unit" used in the embodiments of the disclosure denotes a software component or a hardware component such as a field programmable gate array (FPGA) or an application specific integrated circuit (ASIC), and a "unit" performs predetermined functions. However, the "unit" is not limited to the software or hardware. The "unit" may be configured to be stored in an addressable storage medium, or to execute one or more processors. For example, the "unit" may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and "units" may be combined into a lesser number of components and the "units" or further divided into a greater number of components and "units." Moreover, the components and the "units" may be implemented to execute one or more central processing units (CPUs) in a device or security multimedia card. In embodiments of the disclosure, the "unit" may include one or more processors.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the $3^{rd}$ Generation Partnership Project (3GPP), high rate packet data (HRPD) and ultra mobile broadband (UMB) of 3GPP2, 802.16e of the Institute of Electrical and Electronic Engineers (IEEE), or the like. Also, with the development of $5^{th}$ generation (5G) wireless communication systems, the 5G or new radio (NR) communication standards have been established.

As a representative example of the broadband wireless communication system, the 5G system or the NR system has adopted an orthogonal frequency division multiplexing (OFDM) scheme in a downlink (DL) and an uplink (UL). In more detail, a cyclic-prefix OFDM (CP-OFDM) scheme has been adopted in the DL, and along with the CP-OFDM scheme, a discrete Fourier transform spreading OFDM (DFT-S-OFDM) scheme has been adopted in the UL. A UL denotes a radio link for a terminal (a UE or a MS) to transmit data or a control signal to a base station (a gNode B (gNB), an eNode B (eNB), or a BS), and a DL denotes a radio link for the base station to transmit data or a control signal to the terminal. According to this multiple access scheme, data or control information of different users may be separately identified by allocating and managing time-frequency resources allocated to carry the data or control information of different users in a manner that the time-frequency resources are not overlapped with each other, that is, orthogonality is achieved between the time-frequency resources.

The 5G system or the NR system adopts a hybrid automatic repeat request (HARQ) scheme, in which, when a decoding failure occurs in initial transmission, corresponding data is re-transmitted in a physical layer. An HARQ scheme denotes a scheme, in which, when a receiving module fails to accurately decode data, the receiving module transmits negative acknowledgement (NACK) with respect to the decoding failure to a transmitting module, so that the transmitting module may re-transmit corresponding data in a physical layer. The receiving module may increase the receiving performance by combing the data re-transmitted by the transmitting module with the data previously failed to be decoded. Also, when the receiving module succeeds in accurately decoding data, the receiving module may transmit acknowledgement (ACK) with respect to the decoding success to the transmitting module, so that the transmitting module may transmit new data.

Meanwhile, New 5G communication, NR systems (new radio access technology), have been designed to be able to freely multiplex various services in time and frequency resources. Thus, waveforms, numerology, reference signals, etc. may be dynamically or freely allocated according to necessity of the corresponding services. In order to provide an optimal service to a terminal in wireless communication, optimized data transmission via the measurement of a channel quality and the amount of interference is important, and thus, it is required to accurately measure a channel state.

However, unlike fourth generation ($4^{th}$) generation (4G) communication, in which the channel and interference characteristics do not greatly change according to frequency resources, in the case of 5G or NR channels, the channel and interference characteristics greatly vary according to services. Thus, the support of subsets with respect to a frequency resource group (FRG), which enables the separate measurement of the channel and interference characteristics, is required. Types of services supported in the 5G system or the NR system may be divided into categories, such as enhanced mobile broadband (eMBB), massive machine type communication (mMTC), ultra-reliable and low-latency communication (URLLC), etc. The eMBB is a service for high rate transmission of high volume data, the mMTC is a service for minimization of terminal power consumption and access of multiple terminals, and the URLLC is a service for high reliability and low latency. According to types of services applied to a terminal, different requirements may be adopted.

The URLLC service from among the services described above is aimed at high reliability and low latency, and thus, it may be needed to transmit control information and data information, which may be transmitted through a physical channel, at a low coding rate. With respect to the control information, the function of repetitive transmission of the control information has been already implemented in machine type communication (MTC) or narrow band Internet-of-things (NB-IoT) services of the long term evolution (LTE). The purpose of this implementation is in providing a high coverage for terminals having a small bandwidth, and thus, latency is not sufficiently considered. Also, a smallest unit of the repetitive transmission of the control information is fixed to a sub-frame unit, based on the LTE. In order to support the URLLC service in the NR system or the 5G system, a mode of repetitive transmission of control information that demands a little latency, while increasing the reliability, is needed to be adopted. Thus, the disclosure is based on a situation in which the control information is repetitively transmitted in a slot. Additionally, a situation in which the control information is repetitively transmitted, not being limited to a boundary of a slot, is also considered. Via the operations provided in the disclosure, a terminal may be able to detect control information transmitted from a base station, relatively more rapidly and reliably.

In the disclosure, each term as used herein is that defined by taking into account a function, but the term may vary depending on the intention of users or one of ordinary skill in the art, precedents, or the like. Therefore, the definitions should be made based on the contents throughout the specification. Hereinafter, a base station is an entity configured to allocate a resource for a terminal and may be at least one of a gNode B (gNB), an eNode B (eNB), a Node B, a BS, a radio access unit, a base station controller, or a node on a network. A terminal may include a UE, an MS, a cellular phone, a smartphone, a computer, or a multimedia system capable of performing a communication function. In the disclosure, a DL is a radio transmission path of a signal transmitted from the BS to the UE, and a UL is a radio transmission path of a signal transmitted from the UE to the BS. Also, in the disclosure, an NR system is described as an example, hereinafter. However, the disclosure is not limited thereto, and various communication systems having similar technical backgrounds or channel types may also be applied to the embodiments of the disclosure. Also, the embodiments of the disclosure are applicable to other communication systems via one or more modifications within a range not greatly deviating from the scope of the disclosure based on the determination of one of ordinary skill in the art.

In this disclosure, the terms "a legacy physical channel" and "a signal" may be interchangeably used with "data" or "a control signal." For example, a physical downlink shared channel (PDSCH) is a physical channel on which data is transmitted. However, in this disclosure, the PDSCH may be referred to as the data.

In this disclosure, higher layer signaling is signal transmission from the BS to the UE using a DL data channel of a physical layer or signal transmission from the UE to the BS using a UL data channel of a physical layer. The higher layer signaling may also be referred to as radio resource control (RRC) signaling or a medium access control (MAC) control element (CE).

In this disclosure, a higher layer signal may correspond to at least one of RRC, MAC CE, or system access information or pieces of information exchanged at an application level.

In this disclosure, an example of a layer 1 (physical channel) (L1) signal may include at least one of the following descriptions. This is not limited to the corresponding drawing and may be commonly applied to L1 signals described in this disclosure.

A specific bit field value in downlink control information (DCI): a bit field included in the DCI, which may correspond to a previous DCI field (the number of HARQ processes, modulation and coding scheme (MCS) information, a carrier indicator, a bandwidth part (BWP) indicator, an redundancy version (RV) indicator, new data indicator (NDI) information, time allocation information, frequency allocation information, physical uplink control channel (PUCCH) resource information, power allocation information, or the like) or a new DCI field (for example, PUCCH carrier index information for transmitting HARQ-ACK information).

DCI format information: In at least one DCI format monitored by a UE, PUCCH carrier index information for transmitting HARQ-ACK information may be previously configured for each DCI format. For example, DCI format a may be cell index 1, and DCI format b may be cell index 2.

A radio network temporary identifier (RNTI) value used to scramble cyclic redundancy check (CRC) of the DCI: PUCCH carrier index information for transmitting HARQ-ACK information may be previously configured for each RNTI value. For example, RNTI A may be cell index 1, and RNTI B may be cell index 2.

a physical downlink control channel (PDCCH) configuration information (a control resource set (CORESET), search space, etc.) based on which the DCI is transmitted and received. A PDCCH transmission resource to transmit and receive the DCI may vary (a CORESET, search space, a cell index, a BWP, and a time or frequency resource), and PUCCH carrier index information for transmitting HARQ-ACK information may be previously configured for each PDCCH. For example, PDCCH a may be cell index 1, and PDCCH b may be cell index 2.

Also, in describing the disclosure, when the detailed description of the relevant known functions or configurations is determined to unnecessarily obscure the gist of the disclosure, the detailed description thereof may be omitted. The terms as used herein are those defined by taking into account functions in the disclosure, but the terms may vary depending on the intention of users or those of ordinary skill in the art, precedents, or the like. Therefore, the definitions should be made based on the contents throughout the specification.

Hereinafter, in describing the disclosure, the higher layer signaling may correspond to at least one of the following signaling methods or a combination of one or more of the following signaling methods.

a master information block (MIB)
a system information block (SIB) or SIB X (X=1, 2, ...)
RRC
MAC CE Also, L1 signaling may correspond to at least one of signaling methods using a physical layer channel or signaling described below or a combination of one or more of the signaling methods.

a PDCCH
DCI
UE-specific DCI
Group common DCI
Common DCI
scheduling DCI (for example, DCI used for scheduling DL or UL data)
non-scheduling DCI (for example, DCI not used for scheduling DL or UL data)
a PUCCH
UCI Hereinafter, in this disclosure, to determine a priority order between A and B may denote various operations, such as selecting one of the two having a higher priority order based on a predetermined priority rule and performing an operation corresponding thereto or omitting an operation of the other having a lower priority order, etc.

Hereinafter, these examples are described according to various embodiments of the disclosure. However, the embodiments of the disclosure are not independent from each other, and one or more embodiments of the disclosure may be implemented simultaneously or in a combined manner.

Recently, as research into next-generation communication systems has been conducted, various methods of scheduling communication with a UE have been discussed. Accordingly, efficient scheduling and data transmission and reception methods taking into account the characteristics of the next-generation communication systems are demanded. Accordingly, a method of providing a plurality of services to a user in a communication system by providing each service in the same temporal section, appropriately for the corresponding characteristics of each service is required, and an apparatus for using this method is required.

Hereinafter, in the disclosure, a method and apparatus for transmitting HARQ-ACK feedback with respect to DL data transmission are described. In detail, when a UE is to transmit multiple HARQ-ACKs in a slot through a UL, a method of configuring HARQ-ACK feedback bits is described.

In a wireless communication system, in particular, an NR system, a BS may configure, for a UE, one component carrier (CC) or a plurality of CCs for DL transmission. Also, in each CC, a DL transmission and UL transmission slots and symbols may be configured.

When a physical downlink shared channel (PDSCH), which is DL data, is scheduled, at least one of slot timing information with respect to mapping of the PDSCH, information of a position of a start symbol in which PDSCH is mapped, in a corresponding slot, or information of the number of symbols in which the PDSCH is mapped may be transmitted via a specific bit field of the DCI. For example, when the DCI is transmitted in a slot n and the PDSCH is scheduled, and when K0, the slot timing information with respect to the transmission of the PDSCH, indicates 0, a position of the start symbol is 0, and a length of the symbol is 7, the corresponding PDSCH is transmitted by being mapped to seven symbols from the zeroth symbol in the slot n.

After the PDSCH, which is the DL data signal, is transmitted, and after K1 slots, the HARQ-ACK feedback is transmitted from the UE to the BS. K1 information, which is timing information with respect to the HARQ-ACK transmission, may be transmitted through the DCI. An available candidate set of a K1 value may be transmitted via higher layer signaling, and one of the candidates may be determined in the DCI.

When the UE is configured with a semi-static HARQ-ACK codebook, the UE may determine: Table including K0, which is information about a slot in which the PDSCH is mapped, start symbol information, and at least one of information about the number of symbols or information of a length of the symbols; and a feedback bit (or a size of an HARQ-ACK codebook) to be transmitted based on candidate values of K1, which is the HARQ-ACK feedback timing information with respect to the PDSCH. The table including the information about the slot in which the PDSCH is mapped, the start symbol information, and the information of the number of symbols or the length information may have a default value. Alternatively, there may be Table configured by the BS for the UE.

When the UE is configured with a dynamic HARQ-ACK codebook, the UE may, based on K0, which is the information about the slot in which the PDSCH is mapped and the value of K1, which is the HARQ-ACK feedback timing information with respect to the PDSCH, determine the HARQ-ACK feedback bit (or the HARQ-ACK codebook size) that is to be transmitted by the UE according to DL assignment indicator (DAI) information included in the DCI in a slot in which HARQ-ACK information is transmitted.

According to an embodiment of the disclosure, a method and apparatus for configuring an HARQ-ACK code book, when a UE transmits one or more HARQ-ACKs in one slot, is described.

Also, hereinafter in the disclosure, a method and apparatus for transmitting HARQ-ACK feedback with respect to transmission of DL data in a carrier aggregation (CA) environment are described.

In 3GPP LTE Rel-10, a bandwidth extension technique is implemented to support a greater amount of data transmission, compared to LTE Rel-8. This technique, referred to as bandwidth extension or CA, may extend a band thus to increase the amount of data transmission by an extension of the band, compared to a UE of LTE Rel-8 transmitting data in one band. Each of the bands described above is referred to as a CC, and a UE of LTE Rel-8 is configured to have one CC with respect to each of a DL and a UL. Also, a DL CC and a UL CC connected with the DL CC based on SIB-2 are collectively referred to as a cell. The SIB-2 connection relationship between the DL CC and the UL CC is transmitted via a system signal or a higher layer signal. A UE configured to support CA may receive DL data and may transmit UL data through a plurality of serving cells.

According to Rel-10, in a situation where it is difficult for a BS to transmit, to a UE, a PDCCH in a specific serving cell, a carrier indicator field (CIF), which is a field indicating that a PDCCH is transmitted in another serving cell, and that the corresponding PDCCH indicates a PDSCH or a physical uplink shared channel (PUSCH) of the other serving cell, may be configured. The CIF may be configured for the UE supporting the CA. The CIF may be determined for the specific serving cell to indicate another serving cell by adding 3 bits to PDCCH information. The CIF is included only during cross carrier scheduling, and when the CIF is not included, cross carrier scheduling is not performed. When the CIF is included in DL assignment information, the CIF indicates a serving cell in which a PDSCH scheduled by the DL assignment is to be transmitted, and when the CIF is included in UL grant information, the CIF is defined to indicate a serving cell in which a PUSCH scheduled by the UL grant is to be transmitted.

As described above, in LTE-10, CA, which is the bandwidth extension technique, is defined, and thus, a plurality of serving cells may be configured for a UE. Also, the UE may periodically or non-periodically transmit channel information about the plurality of serving cells to a BS for data scheduling of the BS. The BS may transmit data by scheduling the data for each carrier, and the UE may transmit A/N feedback with respect to the data transmitted for each carrier. In LTE Rel-10, it is designed to transmit A/N feedback of maximum 21 bits, and when transmission of A/N feedback and transmission of channel information are overlapped in one sub-frame, it is designed to transmit the A/N feedback and discard the channel information. In LTE Rel-11, it is designed to multiplex channel information of one cell along with A/N feedback and thus to transmit the A/N feedback of maximum 22 bits and the channel information of one cell to a PUCCH format 3 through a transmit resource of the PUCCH format 3.

In LTE-13, a scenario in which a maximum of 32 serving cells are configured is assumed, and a concept of increasing the number of serving cells to the maximum of 32 by using not only a licensed band but also using an unlicensed band is discussed. In this case, collision may occur in channel information transmissions on a plurality of serving cells in one sub-frame, and a new PUCCH format for simultaneously transmitting the plurality of pieces of channel information or A/N feedback is designed. Accordingly, a method of supporting, under various conditions, an operation of a UE, when channel information or A/N feedback with respect to as many serving cells as possible in one sub-frame is multiplexed, is required. That is, the necessity of a method emerges to: determine a transmission operation and a transmit resource of channel information or A/N feedback to be transmitted by the UE, under conditions, such as the number of serving cells configured for the UE, a type of PUCCH format configured for the UE, a configuration for the UE as to whether or not to simultaneously transmit a PUCCH and a PUSCH, and transmission of the PUCCH in another SCell, rather than a PCell configured for the UE; and transmit the channel information and the A/N feedback by using a transmission format mapped in the transmit resource, separately or in combined manner.

Most operational functions of the CA in the 5G NR are the same as the CA applied in the LTE. However, there may be differences in terms of the transmission of the PUCCH. For example, in the LTE, a PUCCH format is determined according to whether UCI to be transmitted by the PUCCH is a scheduling request (SR), HARQ-ACK, channel state information (CSI), or a combination thereof. However, in the NR, the PUCCH format is determined according to the number of UCI bits, regardless of an SR, HARQ-ACK, or CSI. In detail, the PUCCH format is determined according to a length (the number of symbols) of a temporal resource of the PUCCH and the number of UCI bits.

When it is possible that CCs supported for the CA are in the same frequency band as each other or different frequency bands from each other, three CA scenarios below are provided.

1. Intra-band aggregation with frequency-contiguous CCs
2. Intra-band aggregation with non-contiguous CCs
3. Inter-and aggregation with non-contiguous CCs While all of the structures according to the scenarios are the same, radio frequency (RF) complexities of the scenarios may be different from one another. Unlike the LTE, in the NR, maximum 16 carriers are supported, and different frequency bandwidth sizes and duplex modes are supported. A maximum size of one carrier is about 400 MHZ in the NR, and when all 16 carriers have this size, theoretically, the maximum bandwidth size of 6.4 GHz may be supported by CA. Like the LTE, a UE configured to support the CA may support simultaneous reception or transmission with respect to two or more carriers. In the third scenario of the three scenarios described above, it is possible that each carrier has a different TDD configuration. Because the frequency band is different from each other, the carriers do not have to have the same transmission direction. Thus, unlike a UE not supporting the CA, the UE configured to support the CA may require a duplex filter to process the situation described above. In the 3GPP standards, the CA may be described by using the term "cell." Accordingly, the UE configured to support the CA may transmit and receive information to and from multiple cells. One of these cells may be referred to as a PCell, which is a cell that is initially searched and connected by the UE. Thereafter, SCells may be configured via a higher layer signal, and the SCells may be activated or deactivated via a MAC CE or RRC. For example, a bitmap of the MAC CE may indicate the activation or deactivation of the SCells configured via a higher layer signal. Also, the number of DL cells and the number of UL cells may be the same as or different from each other. When the numbers are different, the number of DL cells may be greater than the number of UL cells, in general.

According to an embodiment of the disclosure, the UE may transmit a PUCCH in one slot in the case of the CA.

FIG. 1 is a diagram of a transmission structure of a time-frequency domain that is a radio resource region of a 5G system or an NR system according to an embodiment of the disclosure.

Referring to FIG. 1, in the radio resource region, a horizontal axis indicates a time domain, and a longitudinal axis indicates a frequency domain. A minimum transmission unit in the time domain is an OFDM symbol, and $N_{symb}$ OFDM symbols 102 define one slot 106. A length of a sub-frame may be defined as 1.0 ms, and a radio frame 114 may be defined as 10 ms. A minimum transmission unit in the frequency domain is a sub-carrier, and a bandwidth of the whole system transmission band may be composed of the total of $N_{BW}$ sub-carriers 104. However, the specific numeral values may be variably applied according to a system.

A basic unit of the time-frequency resource region is a resource element (hereinafter, RE) 112 and may be indicated by an OFDM symbol index and a sub-carrier index. A resource block (hereinafter, RB) 108 or a physical resource block (hereinafter, PRB) may be defined as $N_{symb}$ consecutive OFDM symbols 102 in the time domain and as $N_{RB}$ consecutive sub-carriers 110 in the frequency domain. Thus, one RB 108 may be composed of $N_{symb} \times N_{RB}$ REs 102.

In general, a minimum transmission unit of data is an RB. In the 5G system or the NR system, it is common that $N_{symb}=14$ and $N_{RB}=12$. Also, the $N_{BW}$ and the $N_{RB}$ may be proportional to a bandwidth of a system transmission band. A data rate may increase proportionately to the number of RBs scheduled to a UE. In the 5G system or the NR system, in the case of an FDD system operating a DL and a UL that are divided from each other according to a frequency, a transmission bandwidth of the DL and a transmission bandwidth of the UL may be different from each other. A channel bandwidth indicates an RF bandwidth corresponding to a system transmission bandwidth. Table A below illustrates a corresponding relationship between a system transmission bandwidth and a channel bandwidth defined in the LTE system which is the 4G wireless communication prior to the 5G system or the NR system. For example, in an LTE system having a channel bandwidth of 10 MHz, a transmission bandwidth is composed of 50 RBs.

TABLE A

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

In the 5G system or the NR system, operations may be performed in a channel bandwidth that is greater than the channel bandwidth of the LTE presented in Table A. Table B illustrates a corresponding relationship between a system transmission bandwidth and a channel bandwidth and sub-carrier spacing (SCS), in the 5G system or the NR system.

TABLE B

| | SCS | Channel bandwidth $BW_{Channel}$ [MHz] | | | | | | | | |
|---|---|---|---|---|---|---|---|---|---|---|
| | [kHz] | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G system or the NR system, scheduling information about the DL data or the UL data is transmitted from a BS to a UE through DCI. The DCI may be defined according to various formats, and according to each format, the DCI may indicate whether the DCI is scheduling information (UL grant) about the UL data or scheduling information (DL grant) about the DL data, whether or not the DCI is compact DCI having small-sized control information, whether or not the DCI adopts spatial multiplexing using multiple antennas, whether or not the DCI is for controlling power, etc. For example, DCI format 1-1, which is the scheduling control information (DL grant) about the DL data may include at least one from the following control information.

a carrier indicator: indicates which frequency carrier is used for transmission a DCI format indicator: an indicator separately indicating whether the corresponding DCI is for the DL or the UL a bandwidth part (hereinafter, BWP) indicator: indicates on which BWP transmission is to be performed.

frequency domain resource allocation: indicates an RB in the frequency domain allocated for data transmission A resource indicated is determined according to the system bandwidth and the resource allocation method.

time domain resource allocation: indicates which slot and which OFDM symbol in the slot are used to transmit a data-related channel VRB-to-PRB mapping: indicates in which method a virtual RB (hereinafter, VRB) index and a physical RB (hereinafter, PRB) index are to be mapped a modulation and coding scheme (hereinafter, MCS): indicates a modulation scheme and a coding rate used for data transmission That is, the MCS may indicate a coding rate value indicating transport block size (TBS) and channel coding information together with the information about whether the coding scheme is quadrature phase shift keying (QPSK), 16 quadrature amplitude modulation (16 QAM), 64 QAM, or 256 QAM.

codeblock group (CBG) transmission information: indicates information as to which CBG is to be transmitted when CBG re-transmission is configured an HARQ process number: indicates a process number of HARQ a new data indicator: indicates whether HARQ transmission is initial transmission or re-transmission a redundancy version: indicates a redundancy version of the HARQ a transmit power control (TPC) command for a PUCCH: indicates a TPC command for a PUCCH, which is a UL control channel In the case of the PUSCH transmission described above, the time domain resource assignment may be transmitted via: information about a slot in which a PUSCH is transmitted; S, a position of a start OFDM symbol in the corresponding slot; and L, the number of OFDM symbols to which the PUSCH is mapped. S described above may be a relative position from the start of a slot, L may be the number of consecutive OFDM symbols, and S and L may be determined from a start and length indicator value (SLIV) defined as below.

If $(L-1) \le 7$ then
$$SLIV = 14 \cdot (L-1)+S$$
else
$$SLIV = 14 \cdot (14-L+1)+(14-1-S)$$
where $0 < L \le 14-S$ In the 5G system or the NR system, generally, Table in which information about the SLIV, a PUSCH mapping type, and a slot in which the PUSCH is transmitted is included in one row, may be configured via RRC configuration. Thereafter, in the time domain resource assignment of the DCI, index values in the configured table are indicated, and thus, a BS may transmit, to a UE, the information about the SLIV, the PUSCH mapping type, and the slot in which the PUSCH is transmitted.

Type A and type B are defined as the PUSCH mapping type in the 5G system or the NR system. In the PUSCH mapping type A, of the PUSCH mapping type, a first OFDM symbol from among demodulation reference signal (DMRS) OFDM symbols is located in a second or third OFDM symbol of a slot. In the PUSCH mapping type B, the first OFDM symbol from among the DMRS OFDM symbols is located in a first OFDM symbol in the time domain resource assigned by the transmission of the PUSCH. The assignment method of the time domain resource of the PUSCH described above may be likewise applicable to the assignment of a time domain resource of a PDSCH.

The DCI may be transmitted through the PDCCH (or control information, hereinafter, both terms are interchangeably used), after going through channel coding and modulation.

In general, the DCI is scrambled by a specific radio network temporary identifier (RNTI) (or, a UE identifier) separately for each UE, and a cyclic redundancy check (CRC) is added thereto. Thereafter, the DCI is channel-coded and then is configured and transmitted in a separate PDCCH. The PDCCH is mapped and transmitted in a CORESET configured for a UE.

DL data may be transmitted on the PDSCH which is a physical channel for DL data transmission. The PDSCH may be transmitted after a control channel transmission period, and the scheduling information, such as a specific mapping position in the frequency domain, a modulation scheme, etc., is determined based on the DCI transmitted through the PDCCH.

Via the MCS of the control information composing the DCI, the BS notifies the UE about a modulation scheme applied to the PDSCH to be transmitted to the UE and a size of data to be transmitted (TBS). According to an embodiment of the disclosure, the MCS may be composed of 5 bits or more or less than 5 bits. The TBS corresponds to a size of data before channel coding for error correction is applied to the data (a transport block (hereinafter, TB)) to be transmitted by the BS.

In this disclosure, the TB may include a MAC header, a MAC CE, one or more MAC service data units (SDUs), and padding bits. Alternatively, the TB may indicate a data unit transmitted from a MAC layer to a physical layer or a MAC protocol data unit (PDU).

Modulation schemes supported in the 5G system or the NR system include QPSK, 16 QAM, 64 QAM, and 256 QAM, wherein modulation orders (Qm) thereof correspond to 2, 4, 6, and 8, respectively. That is, in the case of the QPSK modulation, 2 bits per symbol, in the case of the 16 QAM modulation, 4 bits per OFDM symbol, in the case of the 64 QAM modulation, 6 bits per symbol, and in the incase of the 256 QAM modulation, 8 bits per symbol may be transmitted.

In the 5G system or the NR system, when the UE is scheduled with the PDSCH or the PUSCH through the DCI, and when the DCI includes a field index m of time domain allocation, the field index m indicates a combination of DMRS type A position information, PDSCH mapping type information, a slot index K0, a data resource start symbol S, and a data resource allocation length L, corresponding m+1 in Table indicating the information about the time domain resource allocation. For example, Table 1 includes the information about the time domain resource allocation.

TABLE 1

PDSCH time domain resource assignment based on a normal cyclic prefix

| Row index | dmrs-TypeA-Position | PDSCH Mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 1, dmrs-typeA-Position is a field indicating a symbol position in which a DMRS is transmitted in one slot indicated by a SIB, which is one of pieces of UE common control information. A value available for the corresponding field is 2 or 3. When a total number of symbols composing one slot is 14, and a first symbol index is 0, 2 denotes a third symbol, and 3 denotes a fourth symbol.

In Table 1, the PDSCH mapping type is information indicating a position of the DMRS in a scheduled data resource region. When the PDSCH mapping type is A, regardless of the assigned data time domain resource, the DMRS is always transmitted and received to and from the symbol position determined by the dmrs-typeA-Position.

When the PDSCH mapping type is B, the DMRS is always transmitted and received in the first symbol of the assigned data time domain resource. In other words, the PDSCH mapping type B does not use the dmrs-typeA-Position information.

In Table 1, K0 denotes an offset of a slot index to which the PDCCH, through which the DCI is transmitted, corresponds, and a slot index to which the PDSCH or the PUSCH, scheduled by the corresponding DCI, corresponds. For example, when the slot index of the PDCCH is n, the slot index of the PDSCH or the PUSCH scheduled by the DCI of the PDCCH is n+K0.

In Table 1, S indicates a start symbol index of the data time domain resource in one slot. An available value of S is in a range of 0 through 13 based on the normal cyclic prefix.

In Table 1, L indicates a length of the data time domain resource section in one slot. An available value of L is in a range of 1 through 14. However, the available values of S and L are determined according to the following Equation 1 and Table 2 or Table 3. Table 1 may show default values used by the UE, before the UE receives the time resource assignment information by UE-specific or UE-common higher layer signaling. For example, a DCI format 0_0 or 1_0 may always use Table 1 as a default time resource region value.

Table 1 shows a PDSCH time domain resource assignment value, and for PUSCH time domain resource assignment, K2 is replaced by K1. The following Table 1-1 is an example table of PUSCH time domain resource assignment.

TABLE 1-1

PDSCH time domain resource assignment based on a normal cyclic prefix

| Row Index | PUSCH Mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |

TABLE 1-1-continued

PDSCH time domain resource assignment based on a normal cyclic prefix

| Row Index | PUSCH Mapping type | $K_2$ | S | L |
|---|---|---|---|---|
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 | if $(L-1) \leq 7$ then $SLIV = 14 \cdot (L-1) + S$ else $SLIV = 14 \cdot (14-L+1) + (14-1-S)$ where $0 < L \leq 14-S$.  Equation 1

Table 2 below shows available combinations of S and L according to whether a cyclic prefix is normal or extended and whether the PDSCH mapping type is type A or type B.

TABLE 2

Available combinations of S and L for time domain resource assignment

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs – TypeA – Position = 3

Table 3 below shows available combinations of S and L according to whether a cyclic prefix is normal or extended and whether the PUSCH mapping type is type A or type B.

TABLE 3

Available combinations of S and L for PUSCH time domain resource assignment

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {3, . . . , 13} | {1, . . . , 14} | {1, . . . , 14} | {0, . . . , 12} | {1, . . . , 12} | {1, . . . , 12} |

In Table 1, each index may be configured through the higher layer signaling parameters PDSCH-TimeDomainResourceAllocationList or PUSCH-TimeDomainResourceAllocationList.

PDSCH-TimeDomainResourceAllocationList includes one or more higher layer signaling parameters PDSCH-TimeDomainResourceAllocation, and PDSCH-TimeDomainResourceAllocation includes k0, a mapping type, and startSymbolAndLength. An available value of k0 is in a range of 0 through 32. Mappingtype may correspond to type A or type B. An available value of StartSymbolAndLength is in a range of 0 through 127. As described above, when Mappingtype corresponds to type A, the symbol position of the DMRS is according to a value indicated by dmrs-typeA-Position.

PUSCH-TimeDomainResourceAllocationList includes one or more higher layer signaling parameters PUSCH-TimeDomainResourceAllocation, and PUSCH-TimeDomainResourceAllocation includes k0, a mapping type, and startSymbolAndLength. An available value of k0 is in a range of 0 through 32. Mappingtype may correspond to type A or type B. An available value of StartSymbolAndLength is in a range of 0 through 127. As described above, when Mappingtype corresponds to type A, the symbol position of the DMRS is according to a value indicated by dmrs-typeA-Position.

PDSCH-TimeDomainResourceAllocation or PUSCH-TimeDomainResourceAllocation is a method of assigning a time domain resource of the PDSCH or the PUSCH in one slot. Higher layer signaling aggregationFactorDL denotes the number of slots, in which a value of PDSCH-TimeDomainResourceAllocation applied in one slot is repetitively transmitted. Higher layer signaling aggregationFactorUL denotes the number of slots, in which a value of PUSCH-TimeDomainResourceAllocation applied in one slot is repetitively transmitted. Available values of aggregationFactorDL and aggregationFactorUL are in a range of {1, 2, 4, 8}. For example, when the value of aggregationFactorDL is 8, it denotes that one of the available values of PDSCH-TimeDomainResourceAllocation is repetitively transmitted throughout the total of 8 slots. However, when at least some of symbols applied to PDSCH-TimeDomainResourceAllocation in a specific slot are UL symbols, PDSCH transmission and reception in the corresponding slot is omitted. Similarly, when at least some of symbols applied to PUSCH-TimeDomainResourceAllocation in a specific slot are DL symbols, PUSCH transmission and reception in the corresponding slot is omitted.

Figure 2:
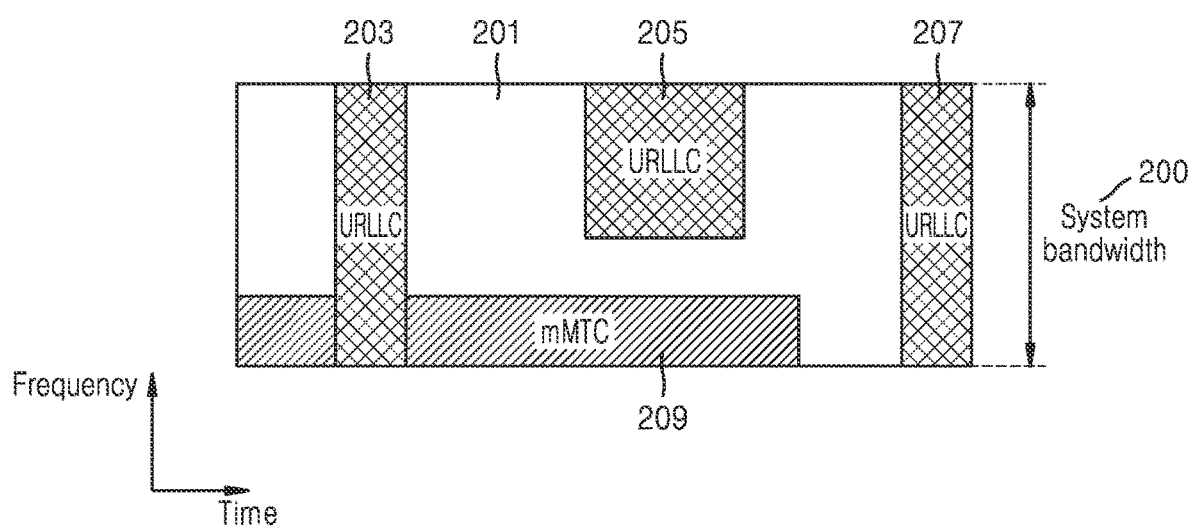
FIG. 2 is a diagram for describing a method of allocating data for enhanced mobile broadband (eMBB), data for ultra-reliability low-latency communication (URLLC), and data for massive machine-type communication (mMTC) in a time-frequency resource region in a 5G system or an NR system according to an embodiment of the disclosure.

FIG. 2 is a diagram for describing a method of allocating data for eMBB, data for URLLC, and data for mMTC in a time-frequency resource region in a 5G system or an NR system according to an embodiment of the disclosure.

Referring to FIG. 2, the data for eMBB, URLLC, and mMTC may be allocated in an entire system frequency band 200. When data for URLLC 203, 205, and 207 is generated and is to be transmitted while eMBB 201 and mMTC 209 are allocated and transmitted in a specific frequency band, the part already allocated to the eMBB 201 and the mMTC 209 may be emptied or the eMBB 201 and the mMTC 209 may not be transmitted, and the data for URLLC 203, 205, and 207 may be transmitted.

From among the services describe above, URLLC may require a reduced latency, and thus, the data for URLLC may be allocated to a part of the resource, to which the eMBB or the mMTC is allocated, and transmitted.

When the URLLC is transmitted by being additionally allocated to the resource to which the eMBB is allocated, the eMBB data may not be transmitted in the overlapped time-frequency resource, and thus, the transmission performance of the eMBB data may be lowered. That is, a transmission failure of the eMBB data may occur, due to the allocation of the URLLC.

Figure 3:
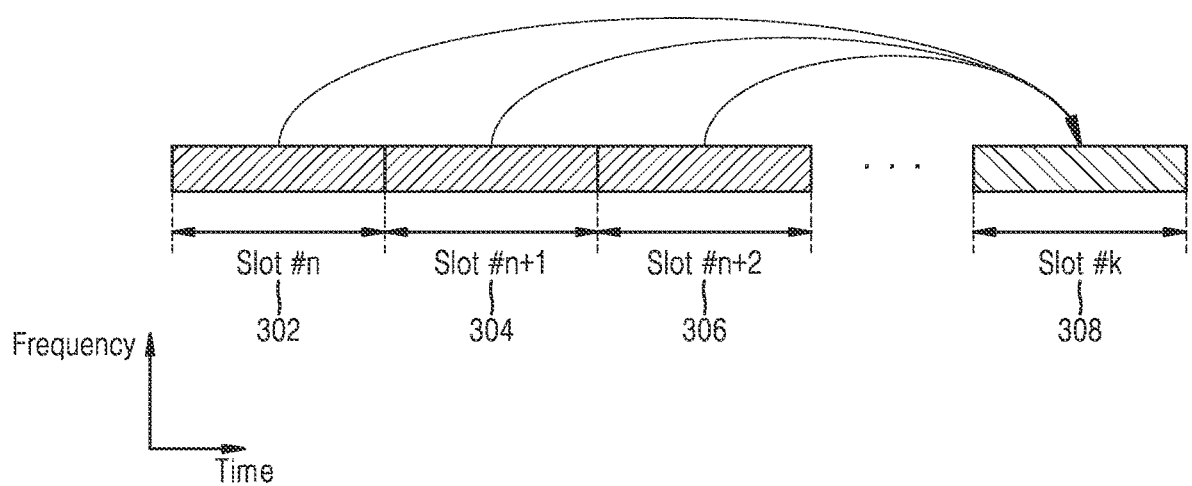
FIG. 3 is a diagram for describing a method of configuring a semi-static hybrid automatic repeat request acknowledgement (HARQ-ACK) codebook in an NR system, according to an embodiment of the disclosure.

FIG. 3 is a diagram for describing a method of configuring a semi-static HARQ-ACK codebook in an NR system, according to an embodiment of the disclosure.

When an HARQ-ACK PUCCH which may be transmitted by a UE in one slot is limited to 1, and the UE receives a higher layer configuration of the semi-static HARQ-ACK codebook, the UE may report HARQ-ACK information with respect to PDSCH reception or SPS PDSCH release of the HARQ-ACK codebook, in a slot indicated by a value of a PDSCH-to-HARQ-feedback timing indicator in a DCI format 1_0 or a DCI format 1_1.

The UE may report a bit value of the HARQ-ACK information of the HARQ-ACK codebook via NACK, in a slot not indicated by the PDSCH-to-HARQ_feedback timing indicator in the DCI format 1_0 or the DCI format 1_1.

Among cases of $M_{A,C}$ for the UE to receive a candidate PDSCH, when the UE reports only the HARQ-ACK information with respect to one case of SPS PDSCH release or one case of PDSCH reception, and the report is scheduled by the DCI format 1_0 including information in which a counter DACI field indicates 1 on a PCell, the UE may determine one HARQ-ACK codebook with respect to the corresponding SPS PDSCH release or the corresponding PDSCH reception.

Except this case, the HARQ-ACK codebook may be determined according to the method described hereinafter.

When a set of cases of a PDSCH reception candidate in a serving cell c is $M_{A,C}$, $M_{A,C}$ may be obtained by [pseudo-code 1] steps as below.

[Start of Pseudo-Code 1]

Step 1: initialize j to be 0 and $M_{A,C}$ to be a null set. Initialize k, an HARQ-ACK transmission timing index, as 0

Step 2: configure R as a set of each row in Table including information about a slot in which a PDSCH is mapped, start symbol information, and information about the number or a length of symbols. When a symbol in which the PDSCH may be mapped that is indicated by each value of R according to the DL and UL based on the higher layer configuration is configured as a UL symbol, delete a corresponding row from R.

Step 3-1: when the UE can receive one PDSCH for unicast in one slot, and R is not a null set, add one to the set $M_{A,C}$ Step 3-2: when the UE can receive more than one PDSCH for unicast in one slot, count the number of PDSCHs that may be allocated to different symbols in calculated R and add the PDSCHs corresponding to the counted number to $M_{A,C}$ Step 4: start from step 2 again by increasing k by 1

Referring to FIG. 3 with respect to the pseudo-code 1 described above, in order to transmit a HARQ-ACK PUCCH in a slot #k 308, all slot candidates available for a PDSCH-to-HARQ-ACK timing which may indicate the slot #k 308 may be considered.

Referring to FIG. 3, it is assumed that the HARQ-ACK may be transmitted in the slot #k 308 based on a combination of the PDSCH-to-HARQ-ACK timings available via a PDSCH scheduled in a slot #n 302, a slot #n+1 304, and a slot #n+2 306. Also, the maximum number of PDSCHs which may be scheduled is derived for each slot by considering time domain resource configuration information of the PDSCH which may be scheduled in each of the slots 302, 304, and 306 and information indicating whether a symbol in the slot is a DL or a UL.

For example, when the maximum of 2 PDSCHs may be scheduled in the slot 302, the maximum of 3 PDSCHs in the slot 304, and the maximum of 2 PDSCHs in the slot 306, the maximum number of PDSCHs included in the HARQ-ACK codebook transmitted in the slot 308 may be 7 in total. This is referred to as the cardinality of the HARQ-ACK codebook.

Figure 4:
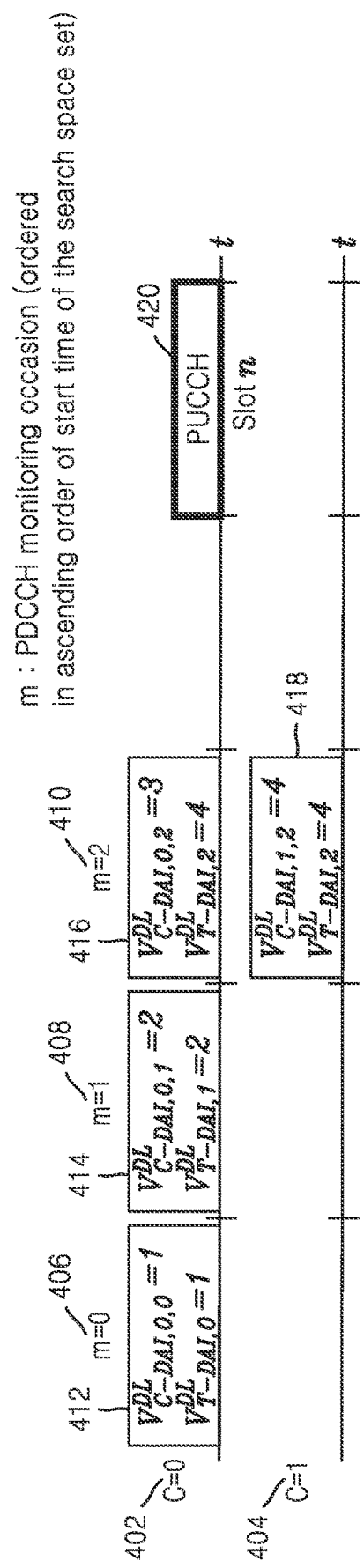
FIG. 4 is a diagram for describing a method of configuring a dynamic HARQ-ACK codebook in an NR system, according to an embodiment of the disclosure.

FIG. 4 is a diagram for describing a method of configuring a dynamic HARQ-ACK codebook in an NR system, according to an embodiment of the disclosure.

The UE may transmit HARQ-ACK information in one PUCCH in a corresponding slot n, based on: the value of PDSCH-to-HARQfeedback timing for transmitting the HARQ-ACK information through the PUCCH in the slot n, with respect to PDSCH reception or SPS PDSCH release; and K0, which is information about a position of a slot in which a PDSCH scheduled in a DCI format 1_0 or 1_1 is transmitted. In detail, to transmit the HARQ-ACK information described above, the UE may determine an HARQ-ACK codebook of the PUCCH transmitted in the slot determined according to the PDSCH-to-HARQfeedback timing and K0, based on a DAI included in DCI indicating the PDSCH or the SPS PDSCH release.

The DAI is composed of a counter DAI and a total DAI. The counter DAI notifies a position of the HARQ-ACK information corresponding to the PDSCH scheduled in the DCI format 1_0 or the DCI format 1_1, in the HARQ-ACK codebook. In detail, the value of the counter DAI in the DCI format 1_0 or 1_1 is information notifying an accumulated value of the PDSCH reception or the SPS PDSCH release scheduled by the DCI format 1_0 or the DCI format 1_1 in a specific cell c. The accumulated value may be configured based on PDCCH monitoring occasions and the serving cells in which scheduled DCI exists.

The total DAI is a value notifying a size of the HARQ-ACK codebook. In detail, the value of the total DAI denotes the total number of PDSCHs or SPS PDSCH releases previously scheduled, wherein the previous scheduling includes a time point in which the DCI is scheduled. In addition, the total DAI may be used when, in a CA scenario, HARQ-ACK information of the serving cell c also includes HARQ-ACK information with respect to a PDSCH scheduled in another cell and the serving cell c. That is, the total DAI may not be provided in a system operating on one cell.

In detail, FIG. 4 is a diagram illustrating a change of values of the counter DAI (C-DAI) and the total DAI (T-DAI) indicated by the DCI searched for each carrier and for each configured PDCCH monitoring occasion, when an HARQ-ACK codebook selected in an $n^{th}$ slot of a carrier 0 402 based on a DAI is transmitted to a PUCCH 420 in a situation where the UE is configured with two carriers.

In the DCI searched in m=0 (406), each of the C-DAI and the T-DAI indicates a value of 1 (see 412). In the DCI searched in m=1 (408), each of the C-DAI and the T-DAI indicates a value of 2 (see 414). In the DCI searched in a carrier 0 (c=0, 402) of m=2 (410), the C-DAI indicates a value of 3 (see 416). In the DCI searched in a carrier 1 (c=1, 404) of m=2 (410), the C-DAI indicates a value of 4 (see 418). Here, when carriers 0 and 1 are scheduled at the same monitoring occasion, the both T-DAIs are indicated as 4.

The determination of the HARQ-ACK codebook in FIGS. 3 and 4 is an operation when only one PUCCH containing the HARQ-ACK information is transmitted in one slot. This case is referred to as mode 1. As an example of a method of determining one PUCCH transmit resource in one slot, when PDSCHs scheduled by different DCI are transmitted by being multiplexed via one HARQ-ACK codebook in the same slot, the PUCCH resource for HARQ-ACK transmission may be determined to be a PUCCH resource indicated by a PUCCH resource field indicated by the DCI lastly scheduling the PDSCH. That is, a PUCCH resource indicated by a PUCCH resource field indicated by the DCI of previous scheduling may be neglected.

The description below defines a method and apparatus for determining an HARQ-ACK codebook when at least two PUCCHs containing HARQ-ACK information may be transmitted in one slot. This case is referred to as mode 2. A UE may operate only in mode 1 (transmit only one HARQ-ACK PUCCH in one slot) or may operate only in mode 2 (transmit one or more HARQ-ACK PUCCHs in one slot). Alternatively, a UE supporting both mode 1 and mode 2 may be configured to operate only in one mode via higher layer signaling of a BS, or mode 1 and mode 2 may be implicitly determined by a DCI format, an RNTI, a specific field value of DCI, scrambling etc. For example, PDSCHs scheduled by DCI format A and pieces of HARQ-ACK information connected to the scheduled PDSCHs may be based on mode 1, and PDSCHs scheduled by DCI format B and pieces of HARQ-ACK information connected to the scheduled PDSCHs may be based on mode 2.

Figure 5:
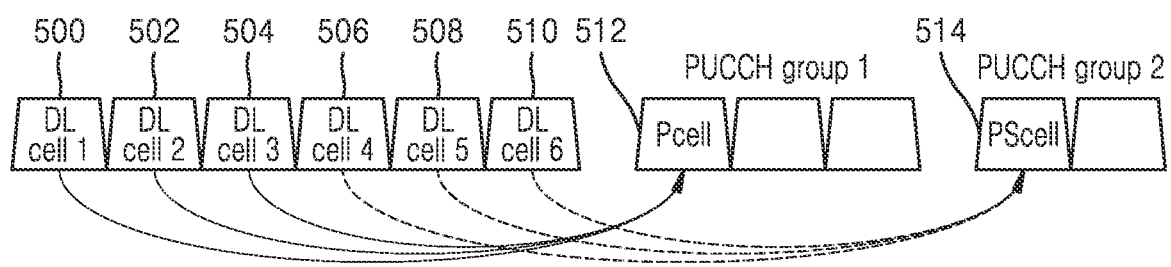
FIG. 5 is a diagram for describing a physical uplink control channel (PUCCH) cell associated with a downlink cell in a carrier aggregation scenario, according to an embodiment of the disclosure.

FIG. 5 is a diagram for describing a PUCCH cell associated with a DL cell in a CA scenario, according to an embodiment of the disclosure.

HARQ-ACK information is used for the purpose for a UE to notify a BS about a result of demodulation/decoding on a scheduled PDSCH. In the NR, all types of feedback (that is, UCI) including the HARQ-ACK information are transmitted on a PCell. As described above, this is because the number of DL cells and the number of UL cells may not always be the same. Thus, the HARQ-ACK information with respect to a greater number of DL CCs may be transmitted and received through one UL carrier. When the number of DL CCs is increased, the bit number of the UCI with respect to the HARQ-ACK or the bit number of other UCI may be increased, and this may be a burden for transmitting the HARQ-ACK through a single UL carrier. In the NR, to compensate for this weakness, two PUCCH groups are configured, and in the first group, a PUCCH including the UCI is transmitted on the PCell and in the second group, the PUCCH including the UCI is transmitted on a PScell. FIG. 5 illustrates this example. According to one or more embodiments of the disclosure, problems which may occur in one PUCCH group or between carriers in the same PUCCH group may be resolved.

The PCell 512 in PUCCH group 1 is a cell in which PUCCH transmission and reception with respect to DL cells 500, 502, and 504 are performed. The PS cell 514 in PUCCH group 2 is a cell in which PUCCH transmission and reception with respect to DL cells 506, 508, and 510 are performed. For the detailed method of generating the PUCCH group, a description of section 6.3.2 of 3GPP standards TS38.331 may be referred to, and for the method of PUCCH transmission and reception based on the PUCCH group, a description of section 9 of 3GPP standards TS38.213 may be referred to.

As described above, the URLLC is a service requiring high reliability and low latency, and thus, it is important to minimize unnecessary latency between the BS and the UE. When the cells on which the CA is performed have TDD configuration information, the BS may allocate a PUCCH transmit resource with respect to DL CCs associated with the same PUCCH group, by taking into account slot format indicator (SFI) configuration information of the PCell. That is, a PUCCH may not be transmitted with respect to symbols indicated as a DL by a higher layer signal or an L1 signal on the PCell. Accordingly, a latency of the PUCCH transmission may be increased. According to an embodiment of the disclosure described hereinafter, methods of minimizing the latency are described.

Figure 6:
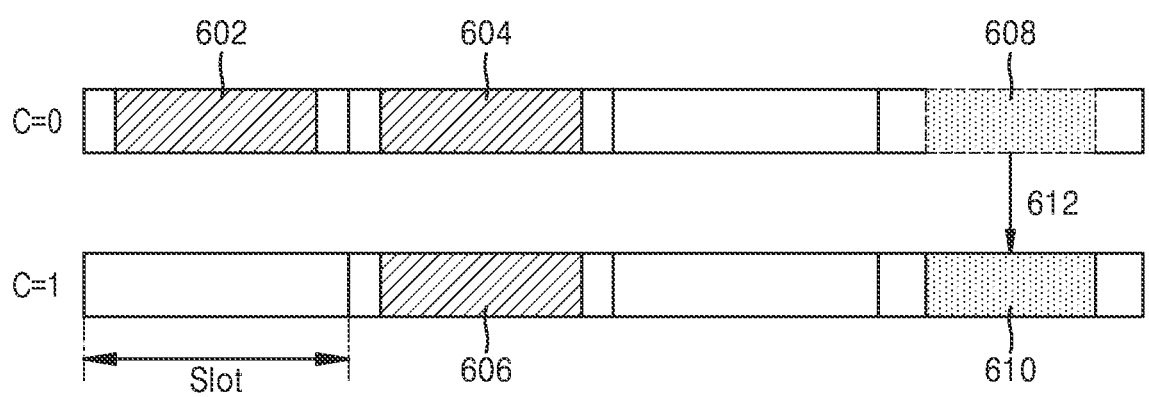
FIG. 6 is a diagram for describing a method of transmitting HARQ-ACK information, when carriers on which carrier aggregation is performed have different time division duplex (TDD) structures from each other, according to an embodiment of the disclosure.

FIG. 6 is a diagram for describing a method of transmitting HARQ-ACK information when the carriers on which CA is performed have different TDD structures from each other, according to an embodiment of the disclosure.

In detail, FIG. 6 illustrates a case in which CA is performed on two carriers in a UE, and a PCell has a cell index of 0 (c=0) and an SCell has a cell index of 1 (c=1). Because the both carriers have the TDD structures, the number of UL cells and the number of DL cells are the same as each other as 2. In this example, it is assumed that a DL cell index and a UL cell index are the same as each other, but the cell indexes may have different values from each other. For example, the DL cell index of 3 may be connected to a UL PCell. Also, the TDD configuration information with respect to the cell of c=0 and the cell of c=1 may be configured to have different directions from each other according to an SFI.

Referring to FIG. 6, a BS may schedule two PDSCHs 602 and 604 according to DCI on the cell of c=0, and a resource to transmit a PUCCH 608 including HARQ-ACK information with respect to the corresponding PDSCHs may be determined according to PDSCH-to-HARQ-ACK timing information of the DCI and a PUCCH resource indicator field. Also, a PUCCH including HARQ-ACK information with respect to a PDSCH 606 scheduled on the cell of c=1 may also be transmitted together with the PUCCH 608. Thus, HARQ-ACK information included in the PUCCH 608 may include demodulation/decoding results with respect to the PDSCHs 602 and 604 of the cell of c=0 and the PDSCH 606 of the cell of c=1. The PUCCH including the HARQ-ACK information may be transmitted by the UE to the BS through the PUCCH 608 of the PCell of c=0.

However, when a portion of a resource of the PUCCH 608 is indicated as a DL symbol via a higher layer signal or an L1 signal, the UE may not transmit the PUCCH 608 and may consider the case as an error case and perform an arbitrary operation. Thus, in order that this situation does not happen, the BS may have to ensure that all of symbols to transmit the PUCCH 608 are UL symbols. In the TDD structure, generally, DL traffic is high, and thus, a rate of DL symbols is higher than that of UL symbols. Thus, as long as a UE satisfies a minimum processing time required for the transmission of HARQ-ACK information with respect to a PDSCH as described in section 5.3 of the 3GPP standards TS 38.214, the BS may configure that the PUCCH 608 is transmitted via an earliest existing UL symbol. However, as illustrated in FIG. 6, when a portion of the resource of the PUCCH 608 is indicated as the DL symbol, the corresponding PUCCH may be scheduled to be delayed to a slot including a UL symbol. As described above, in this type of scheduling, the transmission delay of HARQ-ACK in URLLC may cause a PDSCH re-transmission delay, and thus, the latency of overall data transmission and reception may be increased. Thus, the resource of the PUCCH 608 on the SCell may be included in the same slot on the SCell, rather than the PCell, and when the PUCCH is transmitted on the SCell, rather than the PCell, the latency may be decreased. For example, the UE may consider the PUCCH 608 on the cell of c=0 as a PUCCH 610 on the cell of c=1 by using an explicit or implicit change scheme 612 and may transmit the PUCCH 610 on the cell of c=1.

In this case, the PUCCH 608 may include the same UCI as the PUCCH 610, and the PUCCH resource information may be the same regardless of a cell index or may be explicitly or implicitly changed according to a switched cell. When the PUCCH resource information is the same, the UE assumes that the same PUCCH transmission is performed in both of the cells of c=0 and c=1, based on the lowest RB index based on an activated BWP, regardless of a size of a frequency bandwidth. When the PUCCH resource information is not the same, for example, when a frequency band of the cell of c=0 is 100 MHz, and a frequency band of the cell of c=1 is 10 MHz, frequency resource allocation information, frequency hopping information, PUCCH power allocation information, etc. may be changed. With respect to the changed information, the BS may provide PUCCH-related configuration information described in section 6.3.2 of the 3GPP standards TS 38.331 to the UE for each cell in advance, and the UE may apply the changed information for switched cells by considering the higher layer information. In this case, an additional DCI field or L1 signal may not be required. Alternatively, a combination of two schemes may be applied. For example, when each cell is not configured with different PUCCH configuration information via a higher layer signal, the UE may assume that the PUCCH configuration information is the same for each cell and may comply with the method described above. On the contrary, when each cell is configured with different PUCCH configuration information via a higher layer signal, the UE may perform PUCCH transmission by considering the PUCCH configuration information via the higher layer signal, which is related to a corresponding cell, according to the switched cell index.

Thus, in Rel-15 NR, when a PUCCH resource indicated as a DL symbol is indicated by other DCI, it is considered as an error case. However, when the CA is performed and each carrier has different TDD configuration information as described above with reference to FIG. 6, the error case may not become an error case. At least one of the following examples may support the scheme 612 of FIG. 6.

Scheme 6-1: Implicit Scheme 1 (Switch a Cell Index in which a PUCCH is to be Transmitted According to a Specific Scheme)

This scheme corresponds to a method, according to which PUCCH information is transmitted with respect to valid UL symbols based on slot format information previously configured for each cell without additional L1 signaling. When a PUCCH resource finally indicated by DCI is valid on a PCell, a UE transmits the PUCCH resource on the PCell. On the contrary, when the PUCCH resource finally indicated by the DCI is not valid on the PCell, the UE transmits the PUCCH resource in a SCell that is earliest in order from among SCells in which transmission of the PUCCH resource is available, wherein the order is determined by at least one of the following specific methods. The expression "valid" or "available" denotes that it does not correspond to a case where at least a portion of a symbol of the indicated PUCCH resource is configured/indicated as a DL symbol. Here, a cell index may be a cell index in terms of a logical channel or a cell index in terms of a physical channel Specific scheme 6-1-1: when a PCell index is c=i, cells in which the PUCCH is to be transmitted are determined according to an ascending order (c=0→1→2→ . . . ) or a descending order (c=k→k−1>k−2→ . . . ) of the remaining cell indexes of the SCells, except for the cell having the index of c=i. Here, k may be the total number of cells in which the PUCCH is to be transmitted in the case of CA, the total number of UL transmission cells, or a value configured by a BS. According to this specific scheme, when 0, 5, and 6 of the SCells are valid for the transmission of the PUCCH resource, the PUCCH is transmitted on the S Cell of c=0 according to the ascending order and on the SCell of c=6 according to the descending order.

Specific scheme 6-1-2: when a PCell index is c=i, the cells are determined according to an ascending order or a descending order of the remaining cell indexes of the SCells, except for the cell having the index of c=i. The difference from the specific scheme 6-1-1 is that the ascending order or the descending order is determined based on the PCell index. For example, the ascending order is determined as the PCell (c=i)→c=mod(i+1, k)→c=mod(i+2, k)→c=mod(i+3, k)→[ . . . ]. For example, the descending order is determined as the PCell (c=i)→c=mod(i−1, k)→c=mod(i−2, k)→c=mod(i−3, k)→[ . . . ]. According to this specific scheme, when 0, 5, and 6 of the SCells are valid for the transmission of the PUCCH resource, and when i=4, the PUCCH is transmitted on the SCell of c=5 according to the ascending order and on the SCell of c=0 according to the descending order.

The UE may implicitly select the cell to transmit the PUCCH according to the scheme 6-1. When both of the PCell and the SCells in one PUCCH group are not valid for the transmission of the PUCCH resource, the UE may consider the case as an error case and perform an arbitrary operation.

Scheme 6-2: an Explicit Scheme (Select a Cell Index to Transmit a PUCCH)

This scheme corresponds to a method, according to which a cell index to transmit the PUCCH including UCI is explicitly indicated by a DCI field or L1 signaling, like cross carrier scheduling, in which a cell to transmit and receive a PDCCH is different from a cell to transmit and receive a PDSCH/PUSCH. The following specific schemes may be considered, and at least one thereof may be used.

Specific scheme 6-2-1: an additional DCI field, such as a carrier indication field (CIF), may be included. Here, when a bit field has n bits, a total of Cambria Math cell indexes may be indicated, and the BS may previously notify to the UE which cell index for UL is associated with each value of the bit field via a higher layer signal in advance. Here, the first value may always be a PCell.

Specific scheme 6-2-2: a value of a PUCCH resource indicator, which is a field of DCI indicating a PUCCH resource, may previously include information connected to a specific cell index via a higher layer signal. When a corresponding high layer signal value is not configured, the UE may determine the PUCCH resource indicator information as PUCCH resource information connected to the PCell. In detail, the PUCCH resource indicator information includes a PUCCH format, time/frequency resource information, hopping information, etc. in the higher layer signal configuration information (refer to section 6.3.2 of the 3GPP standards TS 38.331). This higher layer signal configuration information may additionally include information about the cell index for PUCCH transmission.

Specific scheme 6-2-3: the cell index to transmit the PUCCH may be connected with a CORESET or search space index. In detail, a cell index for the transmission of the PUCCH information, with respect to the DCI detected in the higher layer signal configuration information related to the CORESET or the search space, may be previously configured. When the higher layer signal configuration information is not previously included in a higher layer signal related to the CORESET or the search space, the UE may determine that the PUCCH information is to be transmitted on the PCell.

Specific scheme 6-2-4: the cell index to transmit the PUCCH may be connected with an RNTI or other RRC configuration information (sub-slot configuration, an HARQ-ACK codebook index, or a processing time). When the RNTI is A, the UE may interpret that the PUCCH information is to be transmitted on the PCell, and when the RNTI is B, the UE may interpret that the PUCCH information is to be transmitted in one of SCells. Also, the cell index in which the PUCCH information may be transmitted may be determined according to a sub-slot configuration, which is an RRC parameter indicating a PDSCH-to-HARQ-ACK feedback timing in a sub-slot unit that is less than 14 symbols, rather than in a slot unit. Similarly, the cell index in which the PUCCH information may be transmitted may be determined according to a value of an HARQ-ACK codebook index or the processing time capability determined according to a higher layer signal or an L1 signal.

Scheme 6-3: Implicit Scheme 2 (Previously Select a Cell Index to Transmit a PUCCH)

This scheme supports transmission of a PUCCH in other cells in a corresponding cell group, except for a PCell, without a specific L1 signal, like the scheme 6-1. In detail, the cell in which the PUCCH is transmitted is previously designated via a signal, such as RRC or a MAC CE. For example, the PUCCH information with respect to the control and data information transmitted and received in cell A may be designated as cell B via at least one of the signals described above. When there is no additional signal, a UE may determine that the corresponding PUCCH information is transmitted in cell A. Also, a cell to transmit the PUCCH information may be configured for each frame index via the higher layer signals described above. For example, in an even number$^{th}$ slot index, a PUCCH may be transmitted in cell A, and in an odd number$^{th}$ slot index, a PUCCH may be transmitted in cell B. The index may be based on a physical channel or a logical channel. The description above is based on a length of a frame. However, other terms of temporal units, such as a sub-frame, a slot, etc., may substitute the frame.

Figure 7:
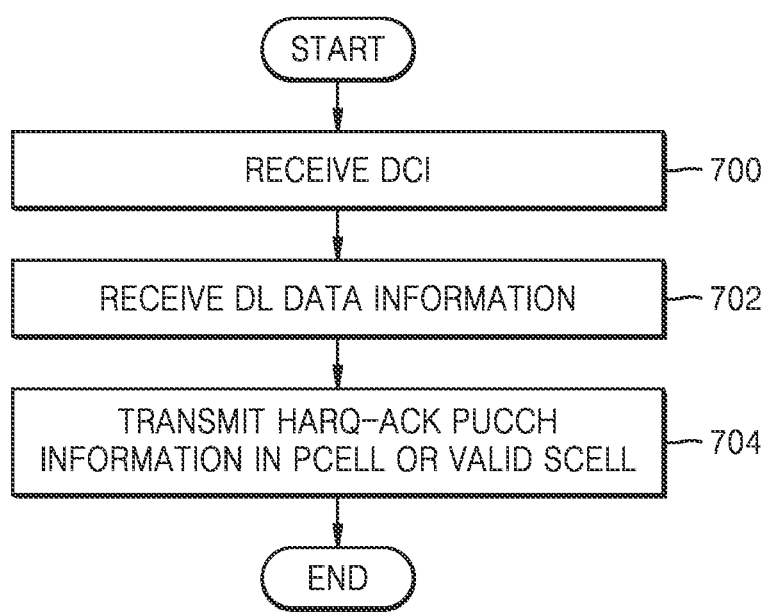
FIG. 7 is a diagram for describing an operation, performed by a terminal, of transmitting HARQ-ACK information in a scenario in which carriers on which carrier aggregation is performed have different TDD structures from each other, according to an embodiment of the disclosure.

FIG. 7 is a diagram for describing an operation, performed by a UE, of transmitting HARQ-ACK information in a scenario in which carriers on which CA is performed have different TDD structures from each other, according to an embodiment of the disclosure.

The UE configured with the CA may receive at operation 700, from a BS, DCI, from a DL control channel configured from one cell or a plurality of cells.

The UE may receive at operation 702 DL data information via self-carrier scheduling or cross-carrier scheduling according to information indicated by the DCI. Self-carrier scheduling is a scheduling scheme in which DCI and data information are transmitted and received in the same cell. Cross-carrier scheduling is a scheduling scheme in which DCI and data information are transmitted and received in different cells.

The UE may transmit, to the BS, a PUCCH including HARQ-ACK information with respect to the reception of the DL data information, in a specific cell. That is, the UE may transmit at operation 704, to the BS, the PUCCH including the HARQ-ACK information, on a PCell or a valid SCell.

According to an embodiment of the disclosure, the UE may transmit PUCCH information with respect to valid UL symbols based on slot format information previously configured for each cell without additional indication of L1 signaling. When a PUCCH resource finally indicated by the DCI is valid on the PCell, the UE may transmit, to the BS, the PUCCH including the HARQ-ACK information, on the PCell.

In contrast, when the PUCCH resource finally indicated by the DCI is not valid on the PCell, the UE may determine a cell to transmit the PUCCH, according to an ascending order or a descending order of the remaining cell indexes, except for the PCell index, and may transmit, to the BS, the PUCCH including the HARQ-ACK information, in the determined cell.

According to an embodiment of the disclosure, when the PUCCH resource finally indicated by the DCI is not valid on the PCell, a cell to transmit the PUCCH is determined according to an ascending order or a descending order of the remaining cell indexes, except for the PCell index, by aligning the ascending order and the descending order of the remaining cell indexes based on the PCell index, and the PUCCH resource is transmitted in the determined cell.

According to an embodiment of the disclosure, the UE explicitly indicated with the cell index to transmit the PUCCH including UCI via a DCI field or L1 signaling may transmit, to the BS, the PUCCH including the HARQ-ACK information, in the indicated cell.

According to another embodiment of the disclosure, the UE may transmit the PUCCH in another cell on the cell group, except for the PCell, without a specific L1 signal. In more detail, the cell in which the PUCCH is transmitted may be previously designated via a signal, such as RRC or a MAC CE. Thus, the UE may transmit, to the BS, the PUCCH including the HARQ-ACK information, in the previously designated cell.

Figure 8:
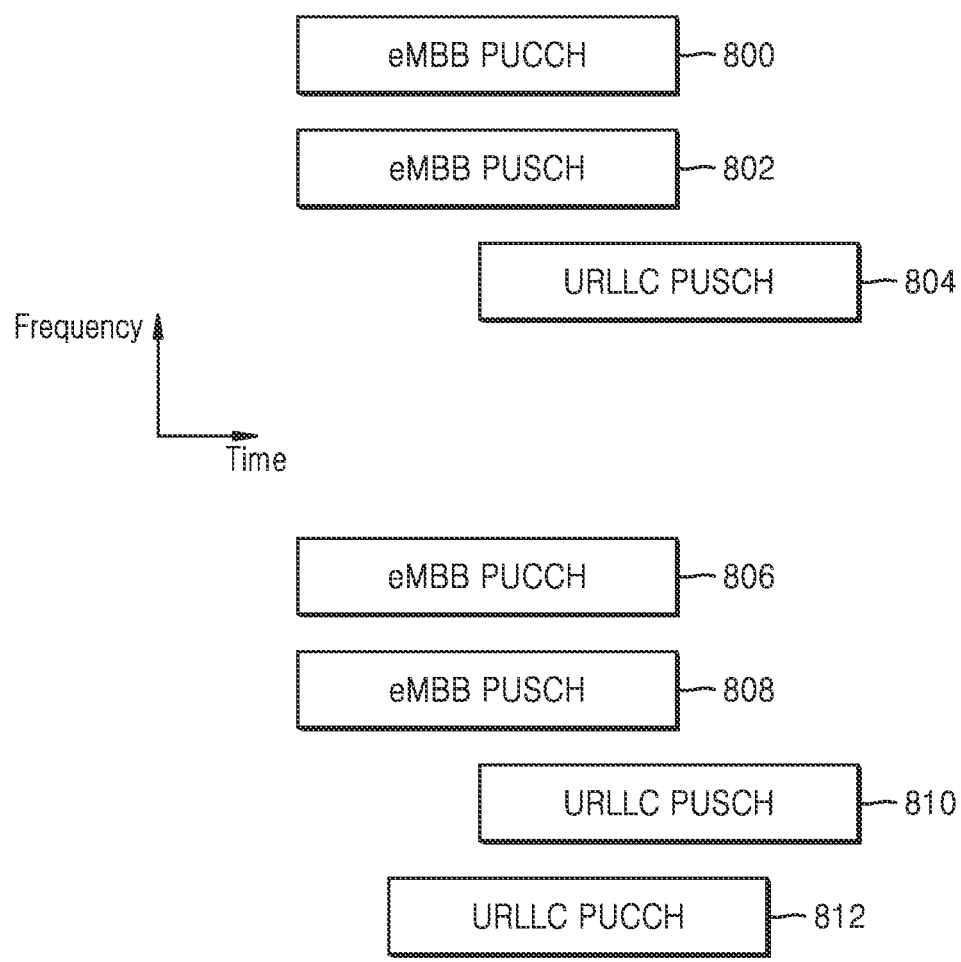
FIG. 8 is a diagram for describing a situation in which an uplink control channel and a data channel that have different priority orders from each other are overlapped with each other on one cell in a time-resource domain, according to an embodiment of the disclosure.

FIG. 8 is a diagram for describing a situation in which a UL control channel and a data channel that have different priority orders from each other are overlapped with each other on one cell in a time-resource domain, according to an embodiment of the disclosure.

A UE may report a UE capability of simultaneously receiving a PUCCH and a PUSCH on one cell. When a BS configures simultaneous transmission of the PUCCH and the PUSCH for the UE, the UE may simultaneously transmit the PUCCH and the PUSCH. Also, the priority order of the PUCCH and the PUSCH may be determined according to a higher layer signal or an L1 signal. For example, whether the PUCCH corresponds to a PUCCH (for example, a URLLC PUCCH) having a high priority order or a PUCCH (for example, an eMBB PUCCH) having a low priority order may be determined according to DCI field information of an L1 signal, an RNTI, DCI format information, and a CORESET/Search space detected in the DCI. Likewise, whether the PUSCH corresponds to a PUSCH (for example, a URLLC PUSCH) having a high priority order or a PUSCH (for example, an eMBB PUSCH) having a low priority order may be determined. In FIG. 8, the priority order is indicated to include two sub-orders. However, the priority order may include more sub-orders. As illustrated in FIG. 8, there may be a case in which an eMBB PUCCH 800, an eMBB PUSCH 802, and a URLLC PUSCH 804 are scheduled via BS scheduling. When multiplexing is possible only with respect to the PUCCH and the PUSCH having the same priority order, the UE may transmit UCI included in the eMBB PUCCH 800 by including the UCI in the eMBB PUSCH 802. However, the UE may not support simultaneous transmission of the eMBB PUSCH and the URLLC PUSCH, and thus, the UE may be required not to include the UCI included in the eMBB PUCCH in the eMBB PUSCH. Thus, the UE may drop the eMBB PUSCH 802 and may perform simultaneous transmission of the eMBB PUCCH 800 and the URLLC PUSCH 804.

According to another embodiment of the disclosure, when the simultaneous transmission of the PUSCH and the PUCCH is possible on one cell, the UE may determine whether or not PUSCHs overlap each other and PUCCHs overlap each other in a time-resource domain from among all PUSCHs and all PUCCHs received from the BS. For example, FIG. 8 illustrates a situation in which an eMBB PUCCH 806, an eMBB PUSCH 808, a URLLC PUSCH 810, and a URLLC PUCCH 812, overlap each other in at least one symbol in a time-resource domain. In this situation, the UE may support at least one of the following two schemes.

Scheme 8-1: perform a drop operation according to a priority order for each of PUSCHs and PUCCHs and transmit only one PUSCH and one PUCCH When the overlapping occurs as illustrated in FIG. 8, the UE may drop the eMBB PUCCH 806 and transmit the URLLC PUCCH 812 in the case of the PUCCH, and may drop the eMBB PUSCH 808 and transmit the URLLC PUSCH 810 in the case of the PUSCH. The advantage of this scheme is that the UE does not need to additionally consider whether or not to multiplex the PUSCH and the PUCCH.

Scheme 8-2: in scheme 8-1, the eMBB PUCCH is dropped, but when the HARQ-ACK feedback information is included in the eMBB PUCCH information, the BS may have to perform re-transmission of all PDSCHs related to the HARQ-ACK information. To solve this problem, the method may be considered, according to which multiplexing of a PUCCH and a PUSCH having a high priority order is supported and a PUCCH having a low priority order is separately transmitted. In FIG. 8, the UCI included in the URLLC PUCCH is transmitted by being included in the URLLC PUSCH, and the eMBB PUCCH is transmitted. Also, because the eMBB PUSCH has a lower priority order than the URLLC PUSCH, the eMBB PUSCH is dropped. Thus, scheme 8-2 has an advantage over scheme 8-1 that the number of channels that are dropped is decreased.

Scheme 8-3: similar to scheme 8-1, but transmit the eMBB PUCCH in a different cell. The eMBB PUCCH may not be transmitted in the situation illustrated in FIG. 8, and thus, when the UE supports CA, the eMBB PUCCH may be transmitted on an SCell, rather than a PCell, like in the scheme described above with reference to FIG. 6.

The PUCCH/PUSCH may be resources scheduled via the DCI or resources previously configured via a higher layer signal.

Figure 9:
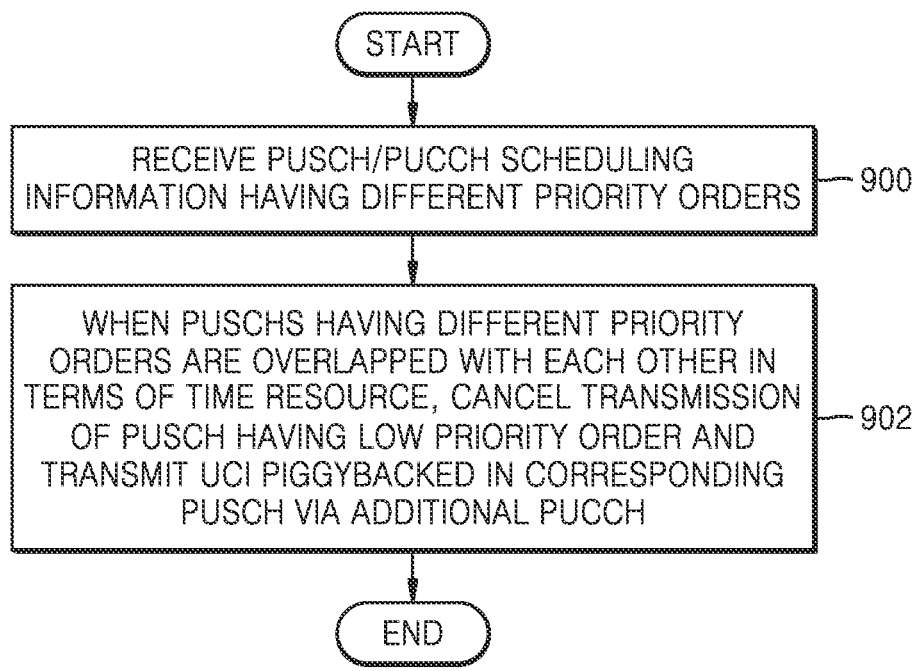
FIG. 9 is a diagram for describing an operation performed by a terminal when an uplink control channel and a data channel that have different priority orders from each other are overlapped with each other on one cell in a time-resource domain, according to an embodiment of the disclosure.

FIG. 9 is a diagram for describing an operation performed by a UE when a UL control channel and a data channel that have different priority orders from each other are overlapped with each other on one cell in a time-resource domain, according to an embodiment of the disclosure.

The UE may receive at operation 900 scheduling information of PUSCHs and PUCCHs having different priority orders.

When the PUSCHs having different priority orders are overlapped with each other in terms of time resource, the UE may cancel transmission of a PUSCH having a lower priority order and may transmit at operation 902 UCI piggybacked in the corresponding PUSCH via an additional PUCCH.

According to an embodiment of the disclosure, the UE may perform a drop operation of some of the plurality of PUSCHs and the plurality of PUCCHs according to the priority orders of each of the PUSCHs and the PUCCHs, and then, may finally transmit only one PUSCH and one PUCCH.

According to another embodiment of the disclosure, the UE may support multiplexing of the PUCCH/PUSCH having a high priority order and may separately transmit the PUCCH having a low priority order.

That is, by using one of the schemes described above with reference to FIG. 8, the UE may drop or multiplex the PUCCHs or the PUSCHs having different priority orders. In detail, the UE may drop one or more PUCCHs or PUSCHs and may transmit the remaining PUCCHs or PUSCHs that are not dropped to the BS.

Figure 10:
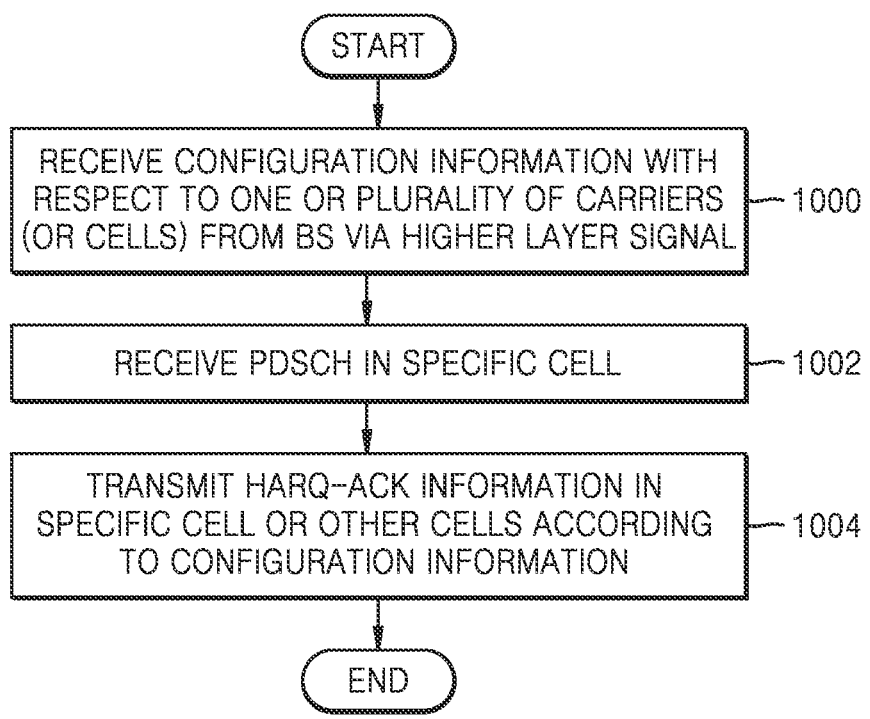
FIG. 10 is a diagram for describing an operation of reporting HARQ-ACK, performed by a terminal, in response to reception of downlink data, according to an embodiment of the disclosure.

FIG. 10 is a diagram for describing an operation of reporting HARQ-ACK, performed by a UE, in response to reception of DL data, according to an embodiment of the disclosure.

At operation 1000, the UE may receive configuration information with respect to one or a plurality of carriers (or cells) from a BS via a higher layer signal, and the following Table 4 is an example of the higher layer signal.

when the UE is able to simultaneously transmit PUCCHs or PUSCHs through a plurality of cells, the UE may be configured with ServCellIndex having a value of other cell indexes rather than the value of the PCell. As another example, the UE may transmit the PUCCH through a different cell index value with respect to each of two PDSCH reception cells.

According to another embodiment of the disclosure, when the UE is able to transmit the PUCCH or the PUSCH through one cell, even if the UE is configured with a plurality of cells, the UE may be configured with ServCellIndex corresponding to the PCell or the same cell index value, in Table 4 above. For example, the UE may transmit the PUCCH through the same cell index value with respect to two PDSCH reception cells. According to another embodiment of the disclosure, even if the UE is not able to simultaneously transmit the PUCCHs or the PUSCHs through a plurality of cells, the UE may be configured with a plurality of cell indexes for a pucch-Cell with respect to one PDSCH reception cell, in Table 4 above.

As described above with reference to FIG. 6, for the transmission of the PUCCH (pucch-Cell) including the HARQ-ACK information with respect to the scheduled PDSCH, the UE may not select one cell index value previously configured via a higher layer signal and may select a value of one of a plurality of cell indexes, via an L1 signal.

According to another embodiment of the disclosure, additional higher layer signal information except for the described higher layer signal may be added in the Table 4 above and may indicate whether the pucch-Cell information

TABLE 4

```
PDSCH-ServingCellConfig ::=    SEQUENCE codeBlockGroupTransmission SetupRelease {
PDSCH-CodeBlockGroupTransmission }  OPTIONAL,  -- Need M: Configuration information
indicating whether or not to support re-transmission in code block unit
xOverhead ENUMERATED { xOh6, xOh12, xOh18 }  OPTIONAL,  -- Need S: Configuration
information about Xoverhead for TBS calculation
nrofHARQ-ProcessesForPDSCH        ENUMERATED   {n2, n4, n6, n10, n12, n16}
OPTIONAL, -- Need S : Configuration information about total number of HARQ-ACK processes
pucch-Cell         ServCellIndex                      OPTIONAL,  -- Cond
SCellAddOnly : Applied by being limited to secondary cell, and designating cell index to transmit
PUCCH including HARQ-ACK information with respect to PDSCH
dynamic-carrier-selection-for-PUCCH ENUMERATED {enable, disable OPTIONAL : Higher layer
signal determining whether or not to dynamically select cell to transmit HARQ-ACK PUCCH
...,
[[
maxMIMO-Layers       INTEGER (1..8)                  OPTIONAL, --Need
M: Configuration information about maximum number of MIMO layers
processingType2Enabled          BOOLEAN              OPTIONAL -- Need
M: Configuration information about processing capability 2
  ]],
}
```

Table 4 shows types of higher layer signals which may be configured for each UE.

At operation 1002, the UE may receive a PDSCH in a specific cell.

At operation 1004, the UE may transmit HARQ-ACK information in a specific cell or other cells according to the configuration information. In more detail, when the UE is configured to receive the PDSCH on an SCell, rather than a PCell, the UE may be additionally configured with ServCellIndex to transmit a PUCCH including the HARQ-ACK information with respect to the corresponding PDSCH, as show in in Table 4 above. Here, with respect to ServCellIndex, one ServCellIndex may be configured for each PUCCH group cell, and a value of ServCellIndex may be a value of the PCell or a value of other cell indexes. This may be determined according to a UE capability. For example, may configure one cell index or a plurality of cell indexes. Also, a higher layer signal parameter for dynamically selecting a carrier to transmit the HARQ-ACK PUCCH, shown as dynamic-carrier-selection-for-PUCCH, may be present in the Table 4 above. When such a higher layer signal parameter is disabled, the UE may have a fixed cell with respect to transmission of one common HARQ-ACK PUCCH, and a cell index with respect to the pucch-Cell may have one fixed value. When the higher layer signal parameter is enabled, the UE may be configured with information about a pucch-Cell or other serving cells for transmitting a plurality of HARQ-ACK PUCCHs.

The UE may transmit the PUCCH including the HARQ-ACK information to the BS in a specific cell. That is, the UE may be indicated with a specific cell to transmit the PUCCH and may transmit the PUCCH including the HARQ-ACK information to the BS. According to an embodiment of the disclosure, the UE may be explicitly indicated with the cell index to transmit the PUCCH including UCI, via a DCI field or L1 signaling, and may transmit the PUCCH including the HARQ-ACK information to the BS in the indicated cell.

According to another embodiment of the disclosure, the UE may transmit PUCCH information with respect to valid UL symbols based on slot format information previously configured for each cell without additional indication of L1 signaling. When a PUCCH resource finally indicated by the DCI is valid on the PCell, the UE may transmit, to the BS, the PUCCH including the HARQ-ACK information, on the PCell.

In contrast, when the PUCCH resource finally indicated by the DCI is not valid on the PCell, the UE may determine a cell to transmit the PUCCH, according to an ascending order or a descending order of the remaining cell indexes, except for the PCell index, and may transmit, to the BS, the PUCCH including the HARQ-ACK information, in the determined cell.

According to an embodiment of the disclosure, when the PUCCH resource finally indicated by the DCI is not valid on the PCell, a cell to transmit the PUCCH is determined according to an ascending order or a descending order of the remaining cell indexes, except for the PCell index, by aligning the ascending order and the descending order of the remaining cell indexes based on the PCell index, and the PUCCH resource is transmitted in the determined cell. Also, the UE may transmit the PUCCH in another cell on a cell group except for the PCell, without a specific L1 signal. In more detail, the cell in which the PUCCH is transmitted may be previously designated via a signal, such as RRC or a MAC CE. Thus, the UE may transmit, to the BS, the PUCCH including the HARQ-ACK information, in the previously designated cell.

After the UE receives the high layer signal, the UE may determine a cell index to transmit and receive the PUCCH including the HARQ-ACK information with respect to a received PDSCH. The PDSCH may correspond to at least one of a PDSCH scheduled by DCI, a PDSCH (for example, an SPS PDSCH) scheduled without the DCI, a PDSCH (for example, a URLLC PDSCH) having a high priority order according to priority order information, or a PDSCH (for example, an eMBB PDSCH or an MTC PDSCH) having a low priority order according to priority order information. The cell index to transmit and receive the PUCCH including the HARQ-ACK information may be fixed as one cell index or may correspond to a plurality of cell indexes, and as described above with reference to FIGS. 6 and 7, a specific cell index may be explicitly or implicitly selected, or the UE may always transmit the PUCCH including the HARQ-ACK information via one cell index configured via a higher layer signal. The UE receiving the higher layer signal or the L1 signal may perform at least one of the methods described above.

Hereinafter, a method performed by the UE is described, according to which the UE transmits one PUCCH by multiplexing a plurality of PUCCHs, in a situation when a plurality of carriers are aggregated, the UE is to transmit PUCCH including control information in other cells than the PCell, and the plurality of PUCCHs are overlapped with each other in a time-resource domain.

The control information may include UCI and DCI. The UCI denotes control information included in a PUCCH, and the DCI denotes control information included in a PDCCH. The data information may be divided into UL data information and DL data information. The UL data information denotes data information included in a PUCCH, and the DL data information denotes data information included in a PDCCH.

Figure 11:
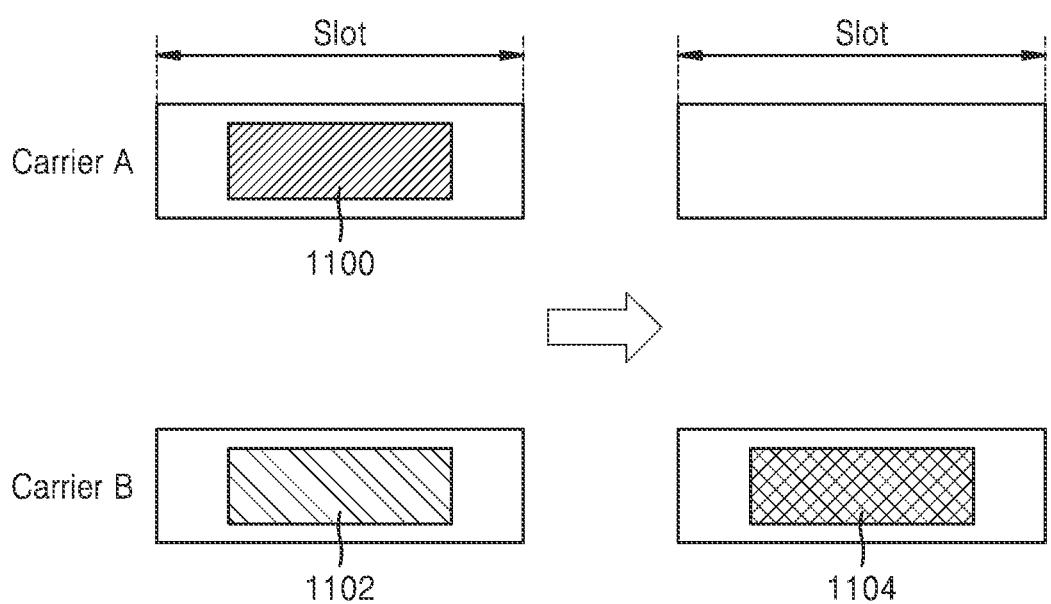
FIG. 11 is a diagram for describing a case in which a plurality of channels are overlapped with each other in a scenario in which carriers are aggregated, according to an embodiment of the disclosure.
Figure 13:
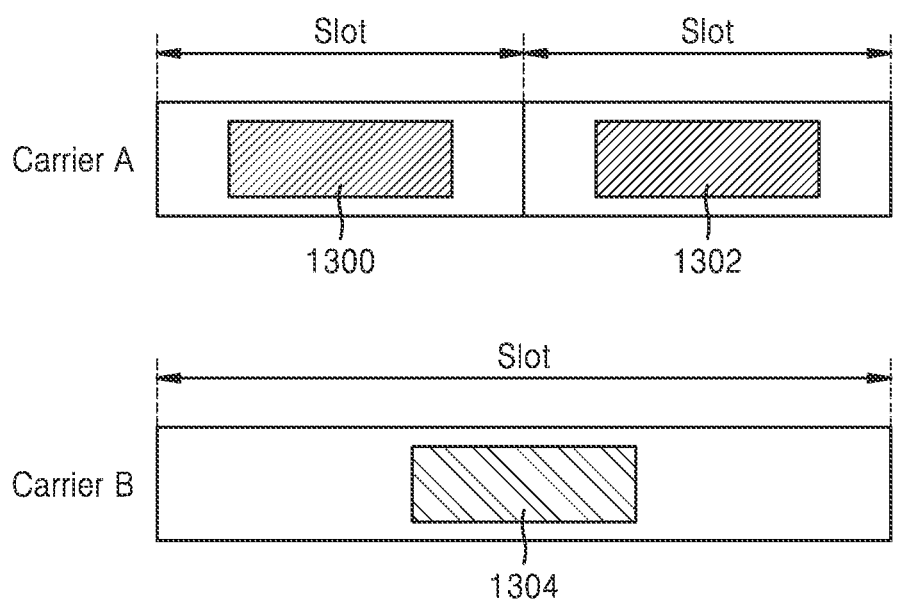
FIG. 13 is a diagram for describing a case in which a plurality of channels are overlapped with each other in a scenario in which carriers are aggregated, according to an embodiment of the disclosure.
Figure 15:
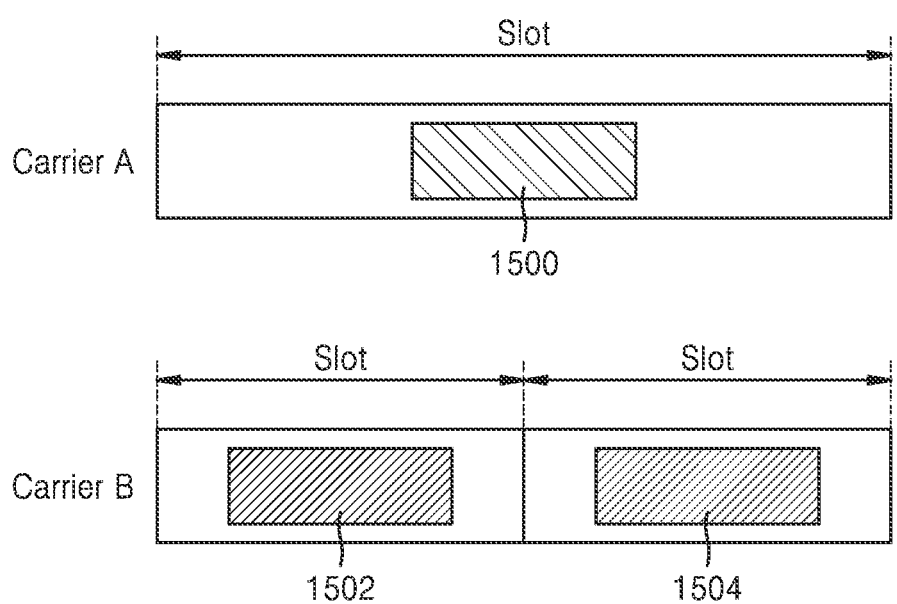
FIG. 15 is a diagram for describing a case in which a plurality of channels are overlapped with each other in a scenario in which carriers are aggregated, according to an embodiment of the disclosure.

When two PUCCHs are overlapped with each other in a specific time section, the UE may multiplex control information of the overlapping PUCCHs and may make one piece of control information and may transmit the piece of control information by selecting one of the two PUCCHs or by allocating the piece of control information to a third PUCCH resource. The third PUCCH resource may be determined based on a size of the control information, PUCCH configuration information, etc. FIGS. 11, 13, and 15 are described by assuming a scenario in which a UE explicitly indicated with a cell index to transmit a PUCCH including UCI via a DCI field or L1 signaling transmits the PUCCH including HARQ-ACK information to a BS in the indicated cell.

The UE may transmit PUCCH information with respect to valid UL symbols based on slot format information previously configured for each cell without additional indication of L1 signaling. When a PUCCH resource finally indicated by the DCI is valid on the PCell, the UE may transmit, to the BS, the PUCCH including the HARQ-ACK information, on the PCell. In contrast, when the PUCCH resource finally indicated by the DCI is not valid on the PCell, the UE may determine a cell to transmit the PUCCH, according to an ascending order or a descending order of the remaining cell indexes, except for the PCell index, and may transmit, to the BS, the PUCCH including the HARQ-ACK information, in the determined cell. According to an embodiment of the disclosure, when the PUCCH resource finally indicated by the DCI is not valid on the PCell, a cell to transmit the PUCCH is determined according to an ascending order or a descending order of the remaining cell indexes, except for the PCell index, by aligning the ascending order and the descending order of the remaining cell indexes based on the PCell index, and the PUCCH resource is transmitted in the determined cell.

According to another embodiment of the disclosure, the UE may transmit the PUCCH in another cell on a cell group except for the PCell, without a specific L1 signal. In more detail, the cell in which the PUCCH is transmitted may be previously designated via a signal, such as RRC or a MAC CE. Thus, the UE may transmit, to the BS, the PUCCH including the HARQ-ACK information, in the previously designated cell.

As described above, FIGS. 12, 14, and 16 are described by assuming a scenario in which a carrier to transmit the PUCCH is implicitly determined.

FIG. 11 is a diagram for describing a case in which a plurality of channels are overlapped with each other in a scenario in which carriers are aggregated, according to an embodiment of the disclosure.

In detail, FIG. 11 illustrates a situation in which PUCCHs 1100 and 1102 to which UCI including at least one of HARQ, an SR, or CSI for each carrier is allocated are overlapped with each other in a time-resource domain, even if the PUCCHs 1100 and 1102 are allocated to different carriers from each other. Each of the PUCCHs 1100 and 1102 may be a resource indicated by DCI or a resource indicated by a higher layer signal, such as RRC, a MAC CE, etc. For example, when Carrier A is a PCell, Carrier B is an SCell, and a UE is able to transmit only one PUCCH on one cell group in a specific time section, the PUCCH 1100 and the PUCCH 1102 may correspond to the following cases.

Case 11-1 (the PUCCH 1100 is a resource configured by a higher layer signal, such as RRC or an MAC CE, and the PUCCH 1102 is a resource indicated by DCI): for example, the PUCCH 1100 may be a resource configured by the RRC (or the MAC CE) to periodically transmit and receive CSI or an SR, and the PUCCH 1102 may be a resource indicated for the purpose of transmitting HARQ-ACK information via control information received by the UE on the PCell or the SCell. Because the UE can transmit only one PUCCH at one time section for each cell group, the UE may have to transmit one PUCCH after multiplexing pieces of UCI included in two PUCCHs, of which at least one symbol is overlapped in the time-resource domain even in different cells, or which are overlapped with each other in the same slot section. Thus, as illustrated in FIG. 11, after the UE multiplexes the UCI on the SCell indicated by the DCI, the UE may transmit a newly determined PUCCH 1104. According to another embodiment of the disclosure, the UE may drop the PUCCH 1100 and may transmit the PUCCH 1102 indicated by the DCI. That is, the UE may not permit multiplexing of the overlapping PUCCHs and may prioritize and transmit a PUCCH indicated by an L1 signal.

Case 11-2 (Both the PUCCH 1100 and the PUCCH 1102 are resources configured by a higher layer signal, such as RRC or an MAC CE): for example, the PUCCH 1100 may be a resource configured by the RRC (or the MAC CE) to periodically transmit and receive CSI or SR information, and the PUCCH 1102 may be a resource indicated for the purpose of transmitting HARQ-ACK information with respect to a PDSCH on which semi-persistent scheduling (SPS) is performed and which is periodically received by the UE on the PCell or the SCell. In this case, the both PUCCH resources are indicated by the higher layer signals, respectively, and thus, it may not be desirable to prioritize a specific resource based on a signal indicating the PUCCH resource as in the case of Case 11-1. Thus, in Case 11-2, a carrier to transmit the PUCCH may be selected according to a type of UCI included in the PUCCH. In the example described above, when the PUCCH 1102 transmits the HARQ-ACK information, and the PUCCH 1100 transmits the CSI or the SR information, the UE may prioritize the carrier configured for the PUCCH 1102 and may transmit the updated PUCCH 1104 after multiplexing the CSI or the SR information included in the PUCCH 1100 with the HARQ-ACK information. According to another embodiment of the disclosure, the PUCCH 1100 may be dropped via higher layer signal configuration, and only the PUCCH 1102 may be transmitted. This scheme may be applied by being limited to a case where two PUCCHs 1100 and 1102 have the same type of UCI.

Case 11-3 (both the PUCCH 1100 and the PUCCH 1102 are resources configured by DCI): When both the PUCCH 1100 and the PUCCH 1102 are resources including HARQ-ACK information indicated by the DCI, the UE may select a cell including a PUCCH resource indicated by the DCI that is lastly scheduled. For example, when the PUCCH 1102 is indicated by the lastly scheduled DCI, the UE may multiplex the HARQ-ACK information included in the PUCCH 1100 and the PUCCH 1102, and then, may transmit the PUCCH 1104 to the BS. According to another embodiment of the disclosure, the two PUCCHs may include the same type of control information, and thus, the UE may transmit only a PUCCH that is lastly scheduled and may drop PUCCHs overlapped therewith. According to another embodiment of the disclosure, the UE may always transmit a corresponding PUCCH in the fixed PCell or a previously configured SCell, regardless of the time at which the PUCCH is scheduled.

The UE may select a cell to transmit the PUCCH and transmit the PUCCH in the selected cell, by considering at least one of the following aspects, with respect to the cases described above. After the UE multiplexes all of the UCI included in the overlapping PUCCHs, the UE may transmit a PUCCH. Alternatively, the UE may multiplex only UCI in a selected PUCCH and transmit a PUCCH. Alternatively, the UE may multiplex only overlapping PUCCHs in a selected cell and may transmit a PUCCH.

Whether or not a configured PUCCH resource is valid: denotes whether or not the entire corresponding PUCCH resource is indicated as a UL symbol via a TDD configuration. When at least one symbol is configured or indicated as a DL symbol, the UE may determine that the corresponding PUCCH resource is not valid, and when no symbol is configured or indicated as a DL symbol, the UE may determine that the corresponding PUCCH resource is valid.

A type of cell in which the PUCCH is transmitted: denotes a cell index to transmit the corresponding PUCCH. In detail, a PCell, an SCell, or index information of a cell is denoted.

Control information included in the PUCCH: denotes at least one combination of control information included in the PUCCH. Here, the control information may be CSI, an SR, or HARQ-ACK.

A size of the PUCCH resource: may denote a time or a size of a frequency resource to which the PUCCH is allocated. Alternatively, a start symbol or an end symbol in the time resource of the PUCCH may be denoted.

A PUCCH format: may include modulation/demodulation schemes for generating a specific PUCCH format. Based on the 5G NR, PUCCH formats 1, 2, 3, 4, and 5 may be denoted.

A type of configuration of a PUCCH resource: denotes by which signal the corresponding PUCCH resource is allocated. In detail, a type of configuration via DCI, a MAC CE, or RRC is denoted.

Whether or not PUCCHs are repetitively transmitted: denotes whether or not the corresponding PUCCH resource is a portion of PUCCH resources repetitively transmitted.

Figure 12:
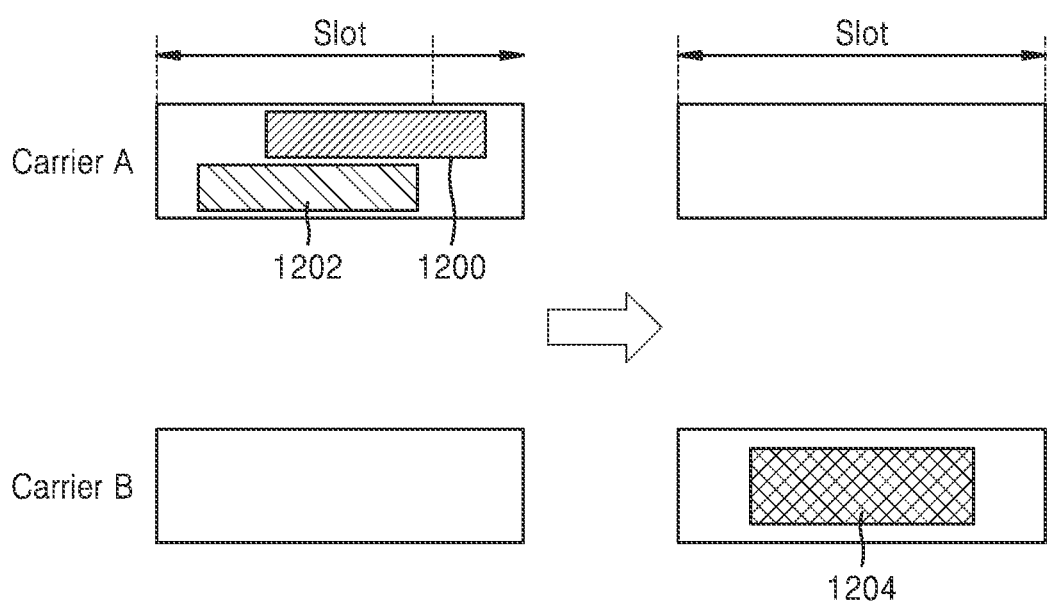
FIG. 12 is a diagram for describing a case in which a plurality of channels are overlapped with each other in a scenario in which carriers are aggregated, according to an embodiment of the disclosure.

FIG. 12 is a diagram for describing a case in which a plurality of channels are overlapped with each other in a scenario in which carriers are aggregated, according to an embodiment of the disclosure.

FIG. 12 illustrates that all PUCCH resources are allocated in carrier A, which is a PCell, and when a finally determined PUCCH resource cannot transmitted on the PCell thereafter, the PUCCH resource is transmitted in Carrier B, rather than the PCell. For example, that the PUCCH resource cannot be transmitted on the PCell denotes that, in a scenario in which a PUCCH 1200 and a PUCCH 1202 are overlapped with each other, a UE may not transmit a corresponding PUCCH when at least one symbol of the PUCCH resource determined after pieces of control information included in the PUCCHs 1200 and 1202 are multiplexed is not an UL symbol. Thus, the UE may transmit the PUCCH resource on an SCell, rather than the PCell. In FIG. 12, Carrier B may be selected, and a PUCCH 1204 may be transmitted in Carrier B. This is similar to the scheme of FIG. 6, in which the UE transmits PUCCH information with respect to valid UL symbols based on slot format information previously configured for each cell without additional L1 signaling indication.

FIG. 13 is a diagram for describing a case in which a plurality of channels are overlapped with each other in a scenario in which carriers are aggregated, according to an embodiment of the disclosure.

In detail, FIG. 13 illustrates a case in which carriers have different SCS values from each other and Carrier A has a higher SCS than Carrier B, unlike the cases of FIGS. 11 and 12. A PUCCH 1300 and a PUCCH 1302 may be CSI or an SR resource configured by a higher layer signal, and a PUCCH 1304 may be a HARQ-ACK information resource indicated by DCI. Here, when a UE transmits the PUCCH 1304, the UE may determine whether or not to multiplex the PUCCH 1300 and PUCCH 1302 with the PUCCH 1304 according to a type of control information included in both of the PUCCH 1300 and the PUCCH 1302 or a position of a slot in which each of the PUCCHs 1300 and 1302 is included. For example, after only one of the PUCCH 1300 and the PUCCH 1302 is multiplexed with the PUCCH 1304, a determined PUCCH resource may be transmitted in Carrier B. That is, in terms of a slot, the PUCCH 1300, which is located in a slot that is in the earliest position from among overlapping slots, is multiplexed with the PUCCH 1304. According to another embodiment of the disclosure, the PUCCH 1302, which is located in a slot that is in the last position, may be multiplexed with the PUCCH 1304. According to another embodiment of the disclosure, when a slot of Carrier B is overlapped with a plurality of slots of Carrier A, a PUCCH located in a slot in the earliest position or a PUCCH located in a slot in the last position may be multiplexed with a PUCCH of Carrier B, regardless of whether or not a PUCCH is assigned to Carrier A. Thus, when there is no PUCCH in a corresponding slot of Carrier A, the UE may not perform multiplexing and may transmit the PUCCH of Carrier B. According to another embodiment of the disclosure, when a slot of Carrier B is overlapped with a plurality of slots of Carrier A, a PUCCH located in a slot in the earliest position or a PUCCH located in a slot in the last position may be multiplexed with a PUCCH of Carrier B, according to whether or not a PUCCH is assigned to Carrier A.

According to another embodiment of the disclosure, the UE may not perform multiplexing and may transmit only a PUCCH assigned to a specific carrier. That is, according to whether SCS values of carriers to which overlapping PUCCH resources correspond are the same as or different from each other, when the SCS values are the same, the PUCCHs may be multiplexed, and when the SCS values are different, the PUCCHs may not be multiplexed, and only one PUCCH may be selected and transmitted, and the remaining PUCCHs may be dropped.

Figure 14:
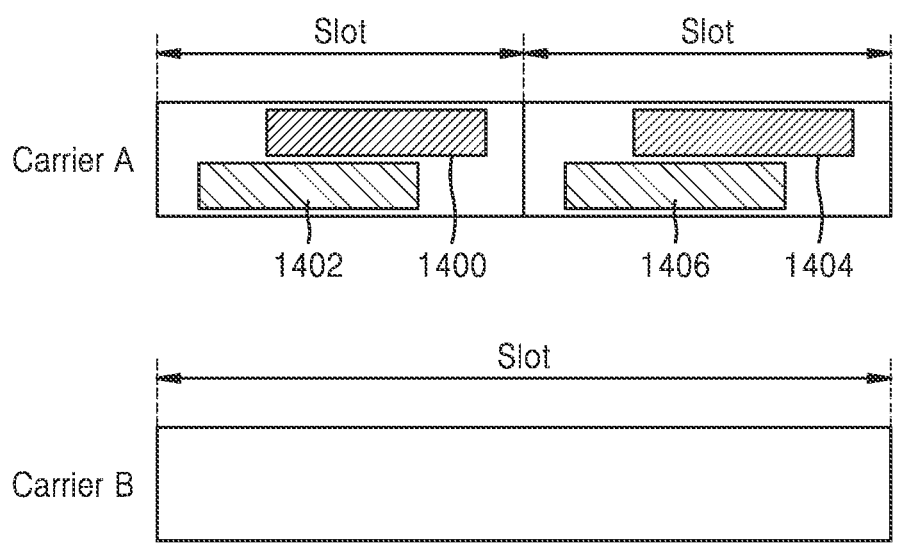
FIG. 14 is a diagram for describing a case in which a plurality of channels are overlapped with each other in a scenario in which carriers are aggregated, according to an embodiment of the disclosure.

FIG. 14 is a diagram for describing a case in which a plurality of channels are overlapped with each other in a scenario in which carriers are aggregated, according to an embodiment of the disclosure.

In detail, FIG. 14 illustrates a case in which two carriers have different SCS values from each other, and PUCCH resource assignment is possible in only a PCell. Also, FIG. 14 illustrates a situation in which a plurality of PUCCHs are overlapped with each other in one carrier. However, the aspect of FIG. 14 may be likewise applied to a case in which PUCCHs are not overlapped with each other, and only one PUCCH is assigned.

When an SCS value of a PCell (Carrier A) is greater than an SCS value of an SCell (Carrier B), the UE may multiplex PUCCHs 1400, 1402, 1404, and 1406 in each slot of the PCell, and after multiplexing the PUCCHs 1400, 1402, 1404, and 1406 in each slot, may determine a PUCCH to be transmitted. When determined PUCCH resources are not valid in all of the slots, the UE may transmit the PUCCH in carrier B. However, as illustrated in FIG. 14, two slots of the PCell are overlapped with one slot of the SCell, and thus, the UE may have to select one of the slots and transmit the PUCCH in Carrier B. Thus, the UE may select the slot by considering at least one of the following aspects.

Transmit, on the SCell, information of a PUCCH in a slot in the earliest position of the PCell Transmit, on the SCell, information of a PUCCH in a slot in the last position of the PCell Prioritize at least one PUCCH on the PCell that is scheduled by DCI, and transmit the at least one PUCCH on the SCell Prioritize a PUCCH on the PCell that includes specific control information and transmit the PUCCH on the SCell. The corresponding specific control information may be at least one of an SR, CSI, or HARQ-ACK.

Select a PUCCH having a high priority order on the PCell and transmit the PUCCH on the SCell. The corresponding priority order Information is determined by a higher layer signal or an L1 signal FIG. 15 is a diagram for describing a case in which a plurality of channels are overlapped with each other in a scenario in which carriers are aggregated, according to an embodiment of the disclosure.

In detail, FIG. 15 illustrates an opposite case in which a plurality of slots of Carrier B are overlapped with one slot of Carrier A. Also, FIG. 15 considers a case in which although when Carrier B is a SCell and Carrier A is a PCell, PUCCH resources are configured on the PCell via a higher layer signal, the corresponding PUCCH resources may not be transmitted on the PCell via TDD configuration information, and the PUCCH resource is transmitted on the SCell.

As described above, all of the PUCCHs on the PCell (e.g., PUCCH 1500) may be dropped, and only the PUCCH on the SCell (1502 or 1504) may be transmitted. Also, only control information included in a PUCCH of a specific slot from among PUCCHs of the PCell may be multiplexed with control information of a PUCCH of the SCell and may be transmitted on the SCell.

According to an embodiment of the disclosure, the control information included in the PUCCH of the PCell may be multiplexed with control information of a specific PUCCH of the SCell, and the PUCCH may be transmitted in a specific slot of the corresponding SCell. Alternatively, the control information of the PCell may be multiplexed in each of PUCCHs to be transmitted in all overlapping slots of the SCell and may be transmitted in each slot of the SCell. The specific slot may be the first slot or the last slot from among the overlapping slots, or a slot configured by higher layer signal. Whether or not slots overlap each other may be determined by whether or not slot units overlap each other regardless of a PUCCH resource or may be determined only based on slots including PUCCH resources. Also, overlapping PUCCHs may be multiplexed only when types of UCI of the overlapping PUCCHs are different from each other. Thus, when the PUCCHs include the same type of UCI, the PUCCH of the PCell may not be multiplexed with the PUCCH of the SCell and may be dropped.

Figure 16:
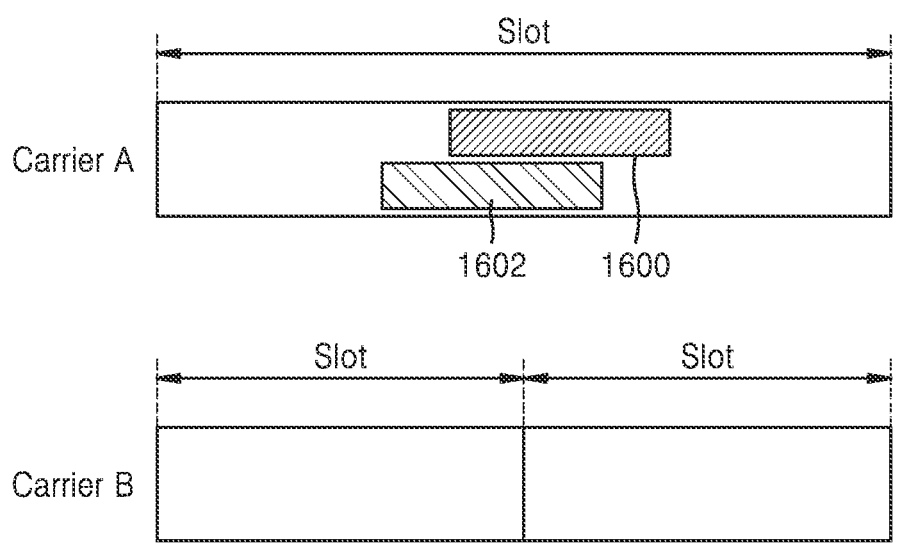
FIG. 16 is a diagram for describing a case in which a plurality of channels are overlapped with each other in a scenario in which carriers are aggregated, according to an embodiment of the disclosure.

FIG. 16 is a diagram for describing a case in which a plurality of channels are overlapped with each other in a scenario in which carriers are aggregated, according to an embodiment of the disclosure.

In detail, FIG. 16 illustrates a case in which SCS of a PCell (Carrier A) has a less value than SCS of an SCell (Carrier B), and after the UE multiplexes PUCCHs 1600 and 1602 in each slot the PCell, the UE may not transmit a PUCCH on the PCell. Here, the UE may have to transmit the PUCCH on the SCell. As illustrated in FIG. 16, because one slot of the PCell is overlapped with two slots of the SCell, the PUCCH may be transmitted in at least one of the two slots, and at least one of the following schemes is possible.

- transmit the PUCCH in the first slot of the SCell from among the slots overlapped with the slot of the PCell
- transmit the PUCCH in the last slot of the SCell from among the slots overlapped with the slot of the PCell
- determine only slots satisfying a processing time for multiplexing the PUCCH, from among the slots overlapped with the slot of the PCell, as the overlapped slots. For example, when the PUCCHs 1600 and 1602 on the PCell are multiplexed in a latter position of the slot on the PCell, the UE may not transmit the PUCCH on the PCell and thus may transmit the PUCCH on the SCell. However, in the first slot of the SCell, transmission of the PUCCH may be difficult due to a limitation of the processing time. Thus, the UE may inevitably have to transmit the PUCCH in the second slot on the SCell.

Figure 17:
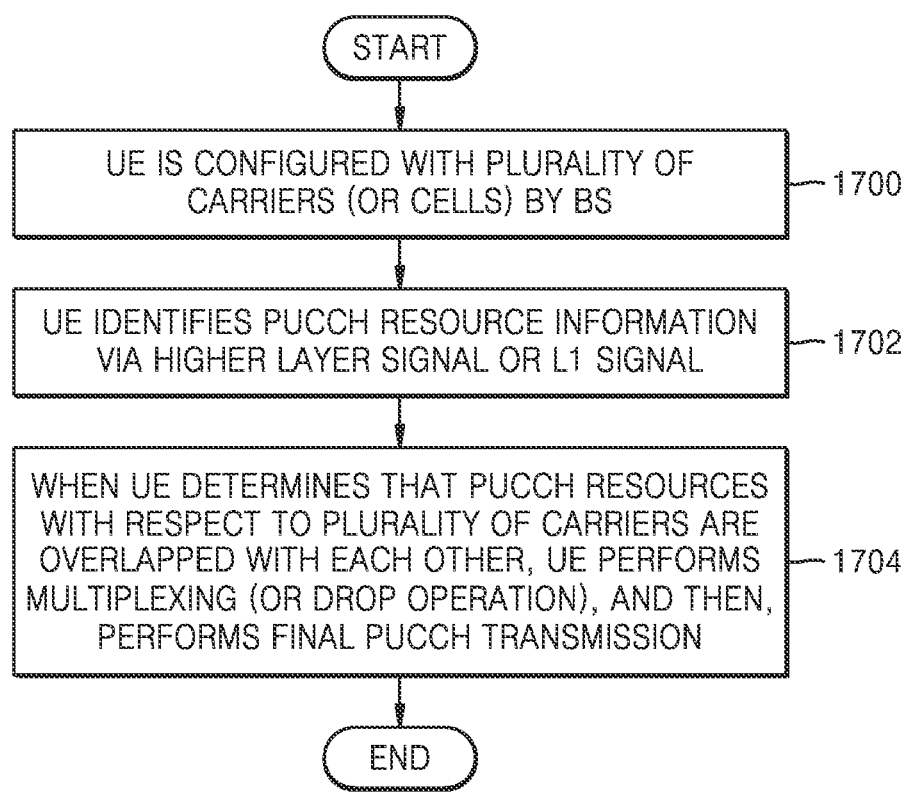
FIG. 17 is a flowchart of a method of transmitting a PUCCH, the method being performed by a terminal operating on aggregated carriers according to an embodiment of the disclosure.

FIG. 17 is a flowchart of a method of transmitting a PUCCH, the method being performed by a UE operating on aggregated carriers according to an embodiment of the disclosure.

At operation 1700, the UE may be configured with a plurality of carriers (or cells) by a BS.

At operation 1702, the UE may identify PUCCH resource information by a higher layer signal or an L1 signal. In detail, the UE may receive relevant information for the PUCCH transmission on an SCell rather than a PCell from the BS. The corresponding information may be limited according to a UE capability of transmitting the PUCCH on the S Cell. The UE not having the capability may transmit the PUCCH only on the PCell on one cell group.

At operation 1704, the UE may transmit the PUCCH based on whether or not PUCCH resources are overlapped with each other on a plurality of carriers.

The UE may have one or more cell groups, and when the UE is configured with two cell groups, the UE may transmit one PUCCH for each cell group. After the UE is configured with respect to CA and with respect to the PUCCH transmission, when the UE is able to transmit the PUCCH on the SCell, the UE may explicitly receive, from the BS, a resource, to which the PUCCH is allocated, and carrier information to transmit the corresponding resource, according to a higher layer signal or an L1 signal.

According to another embodiment of the disclosure, after the UE is configured with respect to CA and with respect to the PUCCH transmission, when the UE is able to transmit the PUCCH on the SCell and does not have explicit information about the resource, to which the PUCCH is allocated, and the carrier to transmit the corresponding resource, the UE may transmit the PUCCH in a carrier for transmitting a valid PUCCH resource.

When the PUCCH resources scheduled via the higher layer signal or the L1 signal are overlapped with each other on one cell or throughout a plurality of cells, the UE may transmit the PUCCH by selecting a specific PUCCH resource and a corresponding carrier according to at least one of a type of control information, SCS between the cells, PUCCH resource information, a PUCCH format, or processing timelines required for the multiplexing, or the UE may perform multiplexing of control information, and then, may select a PUCCH resource to transmit the corresponding multiplexed control information and a carrier to transmit the corresponding resource, according to at least one of a type of control information, SCS between the cells, PUCCH resource information, a PUCCH format, or processing timelines required for the multiplexing.

Figure 18:
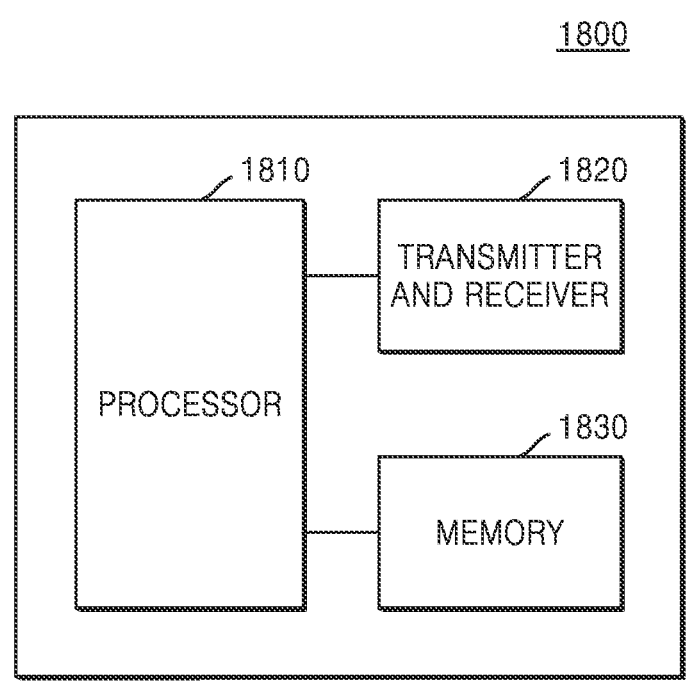
FIG. 18 is a diagram for describing a terminal according to an embodiment of the disclosure.

FIG. 18 is a diagram for describing a UE 1800 according to an embodiment of the disclosure.

The UE 1800 may include a processor 1810, a communicator 1820, and a memory 1830. However, not all of the illustrated components are essential, and thus, the UE 1800 may be implemented by including more or less than the illustrated components. Also, the processor 1810, the communicator 1820, and the memory 1830 may be implemented as a single chip according to cases. The UE 1800 may correspond to the UE described with respect to FIG. 4.

The processor 1810 may include one or more processors or other processing devices configured to control the disclosed functions, processes, and/or methods. An operation of the UE 1800 may be implemented by the processor 1810.

The communicator 1820 may include an RF transmitter configured to perform upward conversion and amplification on a transmitted signal and an RF receiver configured to perform downward conversion on a frequency of a received signal. However, according to another embodiment of the disclosure, the communicator 1820 may be implemented by including more or less than the illustrated components.

The communicator 1820 may be connected to the processor 1810 and may transmit and/or receive a signal. The signal may include control information and data. Also, the communicator 1820 may receive the signal through a wireless channel and may output the signal to the processor 1810. The communicator 1820 may transmit, through the wireless channel, the signal output from the processor 1810.

The memory 1830 may store control information or data included in a signal obtained by the UE 1800. The memory 1830 may be connected to the processor 1810 and may store at least one command, protocol, or parameter with respect to the disclosed functions, processes, and/or methods. The memory 1830 may include read-only memory (ROM), random access memory (RAM), a hard disk, compact disk (CD)-ROM, digital versatile disk (DVD), and/or other storage devices.

Figure 19:
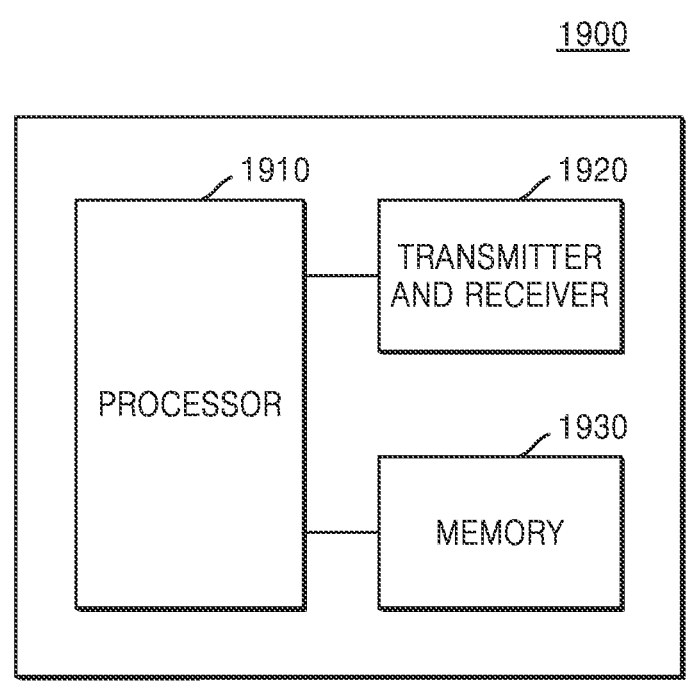
FIG. 19 is a diagram for describing a base station according to an embodiment of the disclosure.

FIG. 19 is a diagram for describing a BS 1900 according to an embodiment of the disclosure.

The BS 1900 may include a processor 1910, a communicator 1920, and a memory 1930. However, not all of the illustrated components are essential, and thus, the BS 1900 may be implemented by including more or less than the illustrated components. Also, the processor 1910, the communicator 1920, and the memory 1930 may be implemented as a single chip according to cases.

The processor 1910 may include one or more processors or other processing devices configured to control the disclosed functions, processes, and/or methods. An operation of the BS 1900 may be implemented by the processor 1910.

The communicator 1920 may include an RF transmitter configured to perform upward conversion and amplification on a transmitted signal and an RF receiver configured to perform downward conversion on a frequency of a received signal. However, according to another embodiment of the disclosure, the communicator 1920 may be implemented by including more or less than the illustrated components.

The communicator 1920 may be connected to the processor 1910 and may transmit and/or receive a signal. The signal may include control information and data. Also, the communicator 1920 may receive the signal through a wireless channel and may output the signal to the processor 1910. The communicator 1920 may transmit, through the wireless channel, the signal output from the processor 1910.

The memory 1930 may store control information or data included in a signal obtained by the BS 1900. The memory 1930 may be connected to the processor 1910 and may store at least one command, protocol, or parameter with respect to the disclosed functions, processes, and/or methods. The memory 1930 may include ROM, RAM, a hard disk, compact disc read only memory (CD-ROM), DVD, and/or other storage devices.

The methods according to the embodiments of the disclosure, described in the claims or the specification may be implemented by hardware, software, or by a combination of hardware and software.

When the methods are implemented by software, a computer-readable recording medium or a computer program product storing one or more programs (software modules) may be provided. The one or more programs stored in the computer-readable recording medium or the computer program product may be configured to be executed via one or more processors in an electronic device. The one or more programs may include instructions for the electronic device to execute the methods according to the embodiments of the disclosure described in the claims and the specification.

The programs (software modules or software) may be stored in non-volatile memories including RAM, flash memory, etc., ROM, electrically erasable programmable ROM (EEPROM), a magnetic disc storage device, CD-ROM, DVDs other optical storage devices, or magnetic cassettes. Alternatively, the programs may be stored in a memory composed of part or all of the memories described above. Also, each of the memories included in the memory may be provided in a multiple number.

Also, the programs may be stored in an attachable storage device, which may be accessed through a communication network, such as the Internet, the Intranet, a local area network (LAN), a wide LAN (WLAN), or a storage area network (SAN), or through a communication network combining the communication networks described above. The storage device may access a device configured to perform the embodiment of the disclosure through an external port. Also, an additional storage device on a communication network may access the device configured to perform the embodiment of the disclosure.

With respect to the detailed embodiments of the disclosure described above, the components included in the disclosure are referred to by a singular term or a plural term according to the provided detailed embodiments of the disclosure. However, the singular term or the plural term may be appropriately selected according to situations that are provided, for convenience of explanation. The disclosure is not limited to the singular components or the plural components. A component referred to by the plural term may be configured as a single component, and a component referred to by the singular term may be configured as a plurality of component.

The embodiments of the disclosure disclosed in the specification and the drawings may provide examples for easily explaining the technical concept of the disclosure and helping understand the disclosure and may not limit the scope of the disclosure. That is, it would be obvious to one of ordinary skill in the art that other modified embodiments are possible based on the technical concept of the disclosure. Also, each embodiment of the disclosure may be executed in combination with another embodiment according to necessity. That is, a BS and a UE may operate by implementing a combination of aspects of embodiment 1, embodiment 2, and embodiment 3 of the disclosure. In addition, the embodiments of the disclosure are disclosed based on the NR system. However, other modified embodiments based on an FDD or TDD LTE system are possible based on the technical concept of the embodiments of the disclosure.

According to an embodiment of the disclosure, when a UE performs one or more HARQ-ACK transmission operations in one slot, the UE may configure an HARQ-ACK codebook. Also, according to embodiments of the disclosure, the UE may transmit a PUCCH in one slot based on CA.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    receiving configuration information including first information indicating a secondary cell (SCell) for physical uplink control channel (PUCCH) transmission and second information associated with a cell for PUCCH transmission corresponding to at least one slot in a frame;
    identifying the SCell as the cell for PUCCH transmission corresponding to the at least one slot in the frame based on the configuration information; and
    based on a plurality of slots on the SCell which overlap with a slot on a primary cell (PCell), transmitting a PUCCH on the SCell in a first slot among the plurality of slots on the SCell.

2. The method of claim 1, wherein the SCell is identified as the cell for PUCCH transmission in unit of time, based on the configuration information.

3. The method of claim 1, wherein the configuration information is received via radio resource control (RRC) signaling.

4. The method of claim 1, wherein the first information includes an index of the SCell.

5. A method performed by a base station (BS) in a wireless communication system, the method comprising:
    transmitting configuration information including first information indicating a secondary cell (SCell) for physical uplink control channel (PUCCH) transmission and second information associated with a cell for PUCCH transmission corresponding to at least one slot in a frame; and
    based on a plurality of slots on the SCell which overlap with a slot on a primary cell (PCell), receiving a PUCCH on the SCell in a first slot among the plurality of slots on the SCell,
    wherein the SCell is identified as the cell for PUCCH transmission corresponding to the at least one slot in the frame based on the configuration information.

6. The method of claim 5, wherein the SCell is identified as the cell for PUCCH transmission in unit of time, based on the configuration information.

7. The method of claim 5, wherein the configuration information is transmitted via radio resource control (RRC) signaling.

8. The method of claim 5, wherein the first information includes an index of the SCell.

9. A user equipment (UE) in a wireless communication system, the UE comprising:
- a transceiver; and
- a processor coupled with the transceiver and configured to:
  - receive configuration information including first information indicating a secondary cell (SCell) for physical uplink control channel (PUCCH) transmission and second information associated with a cell for PUCCH transmission corresponding to at least one slot in a frame,
  - identify the SCell as the cell for PUCCH transmission corresponding to the at least one slot in the frame based on the configuration information, and
  - based on a plurality of slots on the SCell which overlap with a slot on a primary cell (PCell), transmit a PUCCH on the SCell in a first slot among the plurality of slots on the SCell.

10. The UE of claim 9, wherein the SCell is identified as the cell for PUCCH transmission in unit of time, based on the configuration information.

11. The UE of claim 9, wherein the configuration information is received via radio resource control (RRC) signaling.

12. The UE of claim 9, wherein the first information includes an index of the SCell.

13. A base station (BS) in a wireless communication system, the BS comprising:
- a transceiver; and
- a processor coupled with the transceiver and configured to:
  - transmit configuration information including first information indicating a secondary cell (SCell for physical uplink control channel (PUCCH) transmission and second information associated with a cell for PUCCH transmission corresponding to at least one slot in a frame, and
  - based on a plurality of slots on the SCell which overlap with a slot on a primary cell (PCell), receive a PUCCH on the SCell in a first slot among the plurality of slots on the SCell,
- wherein the SCell is identified as the cell for PUCCH transmission corresponding to the at least one slot in the frame based on the configuration information.

14. The BS of claim 13, wherein the SCell is identified as the cell for PUCCH transmission in unit of time, based on the configuration information.

15. The BS of claim 13, wherein the configuration information is transmitted via radio resource control (RRC) signaling.

16. The BS of claim 13, wherein the first information includes an index of the SCell.

\* \* \* \* \*